(12) United States Patent
Ito et al.

(10) Patent No.: US 8,210,627 B2
(45) Date of Patent: Jul. 3, 2012

(54) PRINTING APPARATUS, PRINTING METHOD, AND PROGRAM

(75) Inventors: Tatsumi Ito, Kanagawa (JP); Yuichiro Ikemoto, Kanagawa (JP); Koji Ashizaki, Tokyo (JP); Takeshi Matsui, Tokyo (JP); Masahiro Maikuma, Kanagawa (JP); Shintaro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 12/538,329

(22) Filed: Aug. 10, 2009

(65) Prior Publication Data

US 2010/0039464 A1 Feb. 18, 2010

(30) Foreign Application Priority Data

Aug. 12, 2008 (JP) ................................ 2008-208039

(51) Int. Cl.
  *B41J 3/00* (2006.01)
  *B41J 2/145* (2006.01)
  *B41J 2/15* (2006.01)
(52) U.S. Cl. .................... 347/2; 347/4; 347/41

(58) Field of Classification Search .................. 347/2, 4, 347/41
See application file for complete search history.

(56) References Cited

U.S. PATENT DOCUMENTS

| | | | |
|---|---|---|---|
| 2005/0078142 A1* | 4/2005 | Jones et al. | 347/20 |
| 2006/0209102 A1* | 9/2006 | Jones et al. | 347/4 |

* cited by examiner

*Primary Examiner* — Julian Huffman
(74) *Attorney, Agent, or Firm* — Wolf, Greenfield & Sacks, P.C.

(57) ABSTRACT

A print head which includes at least two discharge nozzle lines arranged on at least two lines, out of a base line corresponding to a radial direction of the rotating print object and at least one offset lines parallel to the base line, discharges ink drops of the same color from discharge nozzles of the discharge nozzle lines, moves the print head so as to minutely move the discharge nozzle lines on the base line or the offset lines, and discharges ink drops of the same color from the discharge nozzles passing through second paths moved minutely from the first paths over the rotating print object. In this way, the ink drops are discharged on the area where print defects are caused because the area is not on the paths of the discharge nozzles before the discharge nozzles are minutely moved.

9 Claims, 21 Drawing Sheets

FIG. 13

PRINTING APPARATUS, PRINTING METHOD, AND PROGRAM

BACKGROUND OF THE INVENTION

1. Field of the Invention

The present invention relates to a printing apparatus, printing method, and a program, and more particularly to a printing apparatus, a printing method, and a program for rotating a disk-shape recording medium, a semiconductor storage medium, and another print object, and discharging ink drops on a printing surface of the rotating print object to print visible information.

2. Description of the Related Art

In recent years, a printing apparatus which can record digital information such as video and voice on a recording surface of a disk-shape recording medium and also can discharge ink drops from a print head to a printing surface opposite to the recording surface to print visible information is proposed.

This type of printing apparatus is categorized into printing apparatuses of a so-called XY scanning method and an Rθ scanning method according to the scanning method of a print head. In the XY scanning method, printing is performed by moving a disk arranged on a disk tray in an insertion/ejection direction of the disk tray (sub-scanning direction), and also moving a print head in a direction perpendicular to the sub-scanning direction (main scanning direction). On the other hand, in the Rθ scanning method, printing is performed by rotating a disk in a circumferential direction (sub-scanning direction), and also moving a print head in a radial direction (main scanning direction) of the rotating disk (refer to Japanese Patent Application Laid-Open No. 09-265760 below).

The print head has a plurality of discharge nozzles (hereinafter also called nozzles), and the plurality of nozzles constitute a plurality of nozzle lines arranged on approximately straight lines of each color, for example, cyan, magenta, yellow, and black. A nozzle array of each color includes a plurality of nozzles arranged in a single line with a nozzle pitch p (single-line arrangement), or a plurality of nozzle lines arranged in two or more lines with nozzle pitches p and s (multiple-line arrangement).

In the multiple-line arrangement, a nozzle array of each color may be configured to realize a nozzle pitch p by a plurality of nozzles arranged in a zigzag shape (zigzag arrangement). In this case, the nozzle array of each color includes, for example, two nozzle lines in which each nozzle line has a plurality of nozzles arranged with a pitch 2p, and the two nozzle lines are shifted against each other by a nozzle pitch p in a length direction of the nozzle line.

Here, the print head having the zigzag arrangement is introduced in, for example, Non-Patent Documents 1 to 5 below. In Non-Patent Documents 1 and 2, a printing apparatus of piezo method having a nozzle pitch p=71 μm (360 dpi) or p=35 μm (720 dpi) is introduced. In Non-Patent Documents 3 to 5, a printing apparatus of bubble method having a nozzle pitch p=21 μm (1200 dpi), and the like are introduced.

[Non-Patent Document 1] "Epson Develops a Next-Generation Inkjet Print Head Using an Original Thin-Film Piezo Element That Has the World's Highest Degree of Distortion", Seiko Epson Corp., Mar. 27, 2007, [Searched on Jul. 25, 2008], [Online], Internet.
<URL: http://www.epson.jp/osirase/2007/070327.htm>

[Non-Patent Document 2] "Epson announces—Next-generation micro piezo head—" Internet information providing site ITmedia+D, Mar. 27, 2007, [Searched on Jul. 25, 2008], [Online], Internet.
<URL: http://plusd.itmedia.co.jp/pcuser/articles/0703/27/news089.html>

[Non-Patent Document 3] "Canon announces eight models such as "BJ F900" which employs a new type head to get a higher speed and higher quality—launches a new brand "PIXUS""Internet information providing site PC Watch, Oct. 2, 2001, [Searched on Jul. 25, 2008], [Online], Internet.
<URL: http://www.watch.impress.co.jp/pc/docs/article/20011002/canon2.htm>

[Non-Patent Document 4] "HP, Secret of the world's fastest photo print speeds in inkjet printers & ink without waste" Hewlett-Packard Japan, Ltd, [Searched on Jul. 25, 2008], [Online], Internet.
<URL: http://h50146.www5.hp.com/products/printers/inkjet/ink_technology.html>

[Non-Patent Document 5] "Technology reports archive—Hewlett-Packard Inkjet Printing Technology: The State of the Art", Hewlett-Packard Development Company, [Searched on Jul. 25, 2008], [Online], Internet.
<URL: http://www.hp.com/oeminkjet/reports/techpress_11.pdf>

SUMMARY OF THE INVENTION

In a print head 20 of the XY scanning method, generally, the nozzle array is arranged in a single line, multiple lines, or a zigzag line in a direction approximately perpendicular to a direction MD in which the print head 20 is moved. Therefore, as shown in FIG. 19A, a plurality of nozzles 30 constituting the nozzle array pass over the disk 100 through a plurality of paths with a nozzle pitch p (shown as the same pitches in FIGS. 19A and 19B).

On the other hand, in a print head 20 of the Rθ scanning method, the nozzle array is arranged in a single line, multiple lines, or a zigzag line, on one or more lines out of the base line B corresponding to the radial direction of a rotating disk 100 (in FIGS. 19B, 20A and FIGS. 21A and 21B, the rotation direction of the disk 100 is shown by a rotation arrow RD) and one or more offset lines O parallel to the base line B.

Therefore, in a case of one line arrangement as shown in FIG. 19B, the plurality of nozzles 30 constituting the nozzle array pass over the disk 100 through concentric paths with a nozzle pitch p. However, in a case of multiple-line arrangement or zigzag arrangement, there is a case in which the plurality of nozzles 30 do not pass over the disk 100 through concentric paths with a nozzle pitch p.

For example, as shown in FIG. 20A, a zigzag arrangement in which the nozzle line A is arranged on the base line B, and the nozzle line B is arranged on the offset line $O_1$ offset from the base line B with a nozzle line pitch s is considered. In this case, the nozzles 30 of the nozzle line A pass through the paths having distances $r_0, r_2, \ldots r_6$ from the rotation center RC of the disk 100 to the nozzles 30, which are measured on the base line B. On the other hand, the nozzles 30 of the nozzle line B pass through the paths having distances in which an offset distance (nozzle line pitch s) is added to the distances $r_1, r_3, \ldots r_7$ from the rotation center RC of the disk 100 to the nozzles 30, which are measured on the base line B. For example, a nozzle passes through a path having a distance $r_1'=\sqrt{(r_1^2+s^2)}$ from the rotation center RC.

Therefore, even though the nozzles 30 of the nozzle lines A and B are arranged in an equal interval such as the nozzle pitch p, the nozzles 30 of the nozzle lines A and B do not pass over the disk 100 through the concentric paths with the nozzle pitch p (in FIGS. 20A, 20B and FIGS. 21A and 21B, shown as different pitches). In addition, as shown in FIG. 20B, in a case of a simple two line arrangement, but not the zigzag arrangement, in the same way, the nozzles 30 of the nozzle line B pass through, for example, a path having a distance $r_1'$ (in this case, $r_1=r_0$, therefore, $r_1'=\sqrt{(r_0^2+s^2)}$).

Next, as shown in FIG. 21A, a zigzag arrangement in which the nozzle line A is arranged on the offset line $O_1$ offset from the base line B by an offset d, and the nozzle line B is arranged on the offset line $O_2$ offset from the base line B by an offset d+s is considered. In this case also, the nozzles 30 of the nozzle line A pass through, for example, a path having a distance $r_0'=\sqrt{(r_0^2+s^2)}$, and the nozzles 30 of the nozzle line B pass through, for example, a path having a distance $r_1'=\sqrt{(r_1^2+(d+s)^2)}$. In addition, as shown in FIG. 21B, also in a case of a simple two line arrangement, but not the zigzag arrangement, the nozzles 30 of the nozzle line B pass through a path having a distance $r_1'$ (in this case, $r_1=r_0$, therefore, $r_1'=\sqrt{(r_0^2+(d+s)^2)}$).

As described above, when the print head 20 of the Rθ scanning method have the multiple-line arrangement or the zigzag arrangement, there is a case in which the plurality of nozzles 30 do not pass over the disk 100 through concentric paths with a nozzle pitch p. Therefore, there is an issue that tracks of inks discharged from the plurality of nozzles 30 are not concentric circle shapes with the nozzle pitch p, and print defects such as irregular colors, moires, and the like are generated in visible information printed on a printing surface 100a.

It is desirable to provide a printing apparatus, a printing method, and a program which can suppress print defects when using a print head of the Rθ scanning method including a plurality of nozzle lines.

According to a first embodiment of the present invention, there is provided, a printing apparatus including: a rotation drive unit for rotating a print object; a print head including at least two discharge nozzle lines arranged on at least two lines, out of a base line corresponding to a radial direction of a circle drawn by the rotating print object and at least one offset lines parallel to the base line, the print head discharging ink drops of the same color from discharge nozzles of the at least two discharge nozzle lines; a head drive unit for moving the print head so as to minutely move each of the discharge nozzle lines on the base line or the offset lines; and a print control unit for controlling the head drive unit so as to minutely move paths of the discharge nozzles passing over the rotating print object, and controlling the print head so as to discharge ink drops from the discharge nozzles passing over the rotating print object through the paths moved minutely, in order to perform printing an area corresponding to a length of the discharge nozzle lines.

According to the above configuration, in order to perform printing for an area corresponding to the length of the discharge nozzle line, the paths of the discharge nozzles passing over the rotating print object are minutely moved, and ink drops are discharged from the discharge nozzles passing over the rotating print object through the paths moved minutely. In this way, after the discharge nozzles are minutely moved, the ink drops are discharged on the area where print defects are caused because the area is not on the paths of the discharge nozzles before the discharge nozzles are minutely moved.

According to a second embodiment of the present invention, there is provided, a printing method including the steps of: discharging ink drops of the same color from discharge nozzles passing through first paths over a rotating print object, by using a print head including at least two discharge nozzle lines arranged on at least two lines, out of a base line corresponding to a radial direction of a circle drawn by the rotating print object and at least one offset lines parallel to the base line; moving the print head so as to minutely move each of the discharge nozzle lines on the base line or the offset lines; and discharging ink drops of the same color from the discharge nozzles passing through second paths moved minutely from the first paths over the rotating print object.

According to a third embodiment of the present invention, there is provided a program for causing a computer to execute a printing method of a second embodiment of the present invention.

According to the embodiments of the present invention, a printing apparatus, a printing method, and a program which can suppress print defects when using a print head of the Rθ scanning method including a plurality of nozzle lines.

BRIEF DESCRIPTION OF THE DRAWINGS

FIG. 13 is a schematic view showing arrangements of print dots when performing printing in which a resolution in the disk rotation direction is twice as high as that of the case shown FIG. 11;

DETAILED DESCRIPTION OF THE PREFERRED EMBODIMENTS

Figure 1:
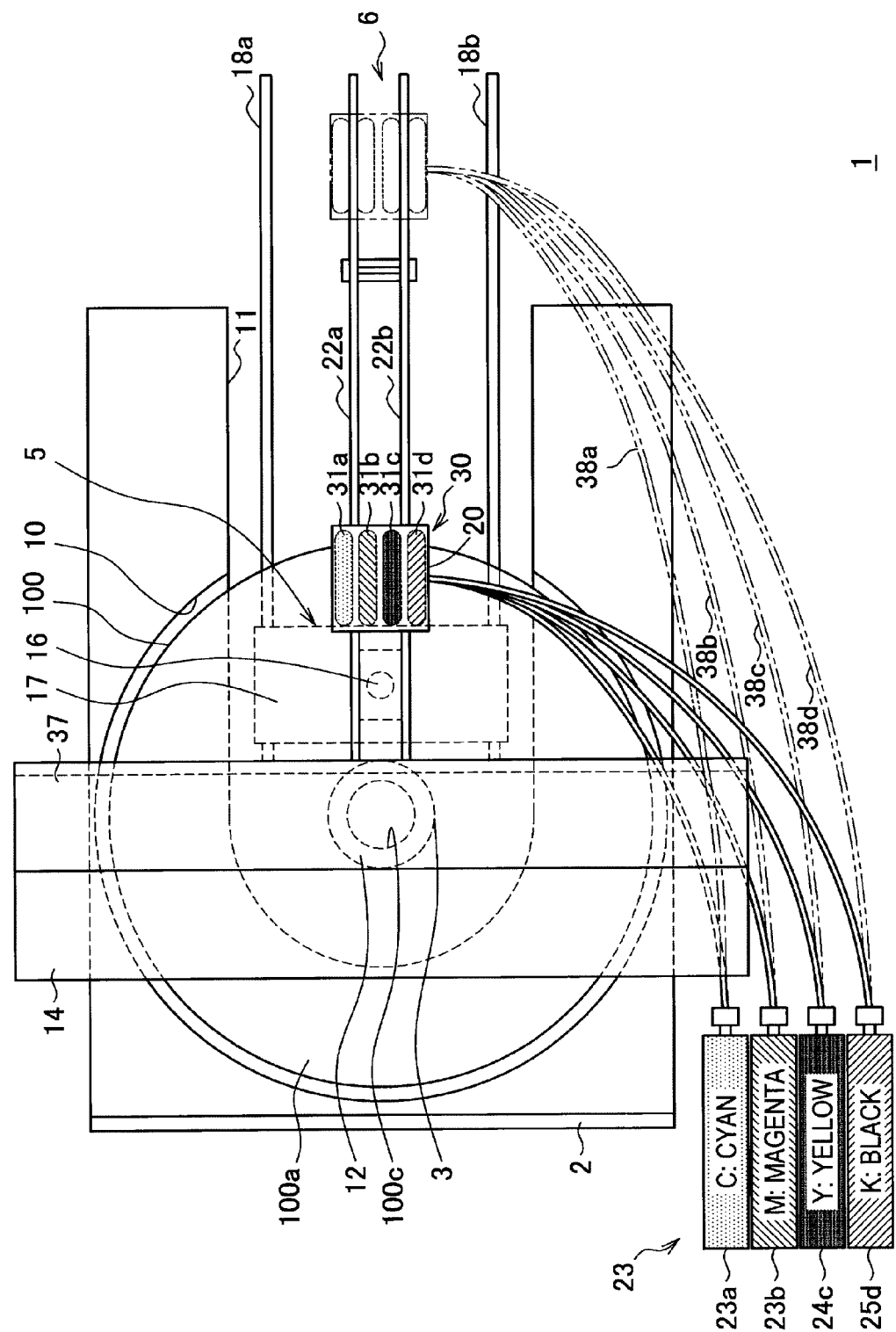
FIG. 1 is a plan view showing a main configuration of a disk apparatus.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

<First Embodiment>

[Configuration of Disk Apparatus 1]

Figure 2:
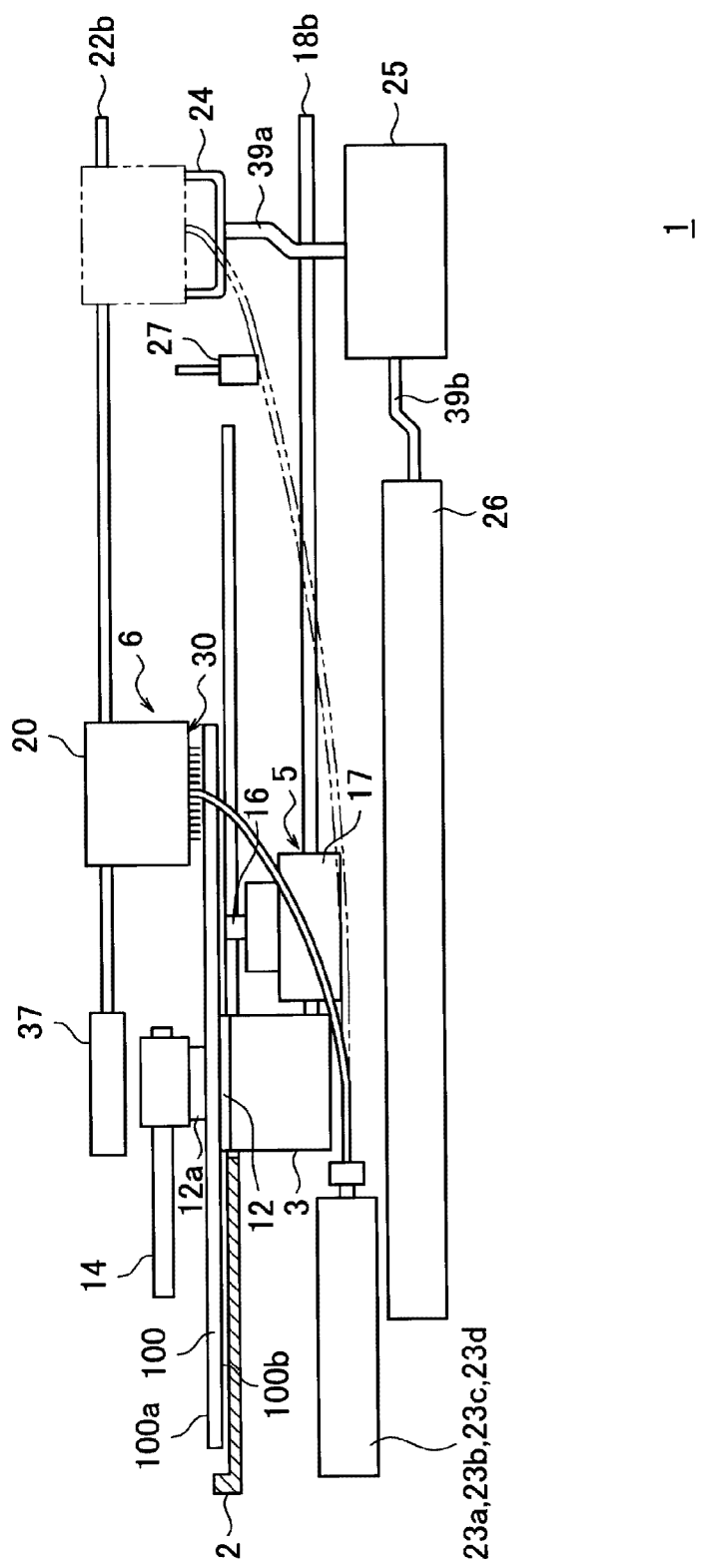
FIG. 2 is a side view showing a main configuration of a disk apparatus.

First, with reference to FIGS. 1 and 2, a configuration of a disk apparatus 1 of an embodiment of the present invention will be described. FIG. 1 is a plan view showing a main configuration of a disk apparatus 1, and FIG. 2 is a side view showing the main configuration of the disk apparatus 1.

The disk apparatus 1 is configured to be able to record and/or reproduce data to/from a recording surface 100b of a disk 100 such as a CD and a DVD, and also be able to print visual information on the printing surface 100a of the disk 100. The disk apparatus 1 includes a tray 2, a spindle motor 3, a recording/reproducing unit 5, a print unit 6, and a control unit 7 (refer to FIG. 3).

The tray 2 is made of a rectangular flat plate member larger than the disk 100, and transports the disk 100. The disk accommodation unit 10 including a circular concave portion for accommodating the disk 100 is provided on the upper surface of the tray 2. A cutout unit 11 for avoiding a contact with the spindle motor 3, the recording/reproducing unit 5, and the like is provided in the tray 2.

The tray 2 is movable in a longitudinal direction (corresponding to the left-right direction in FIGS. 1 and 2) by a tray moving mechanism not shown in the figures, and selectively transported between a disk insertion/ejection position projecting to the outside of the disk apparatus 1 and a disk mounting position where the disk inserted into the housing is mounted. When the tray 2 is transported to the disk mounting position, the disk 100 placed in the disk accommodation unit 10 is mounted on the turntable 12 of the spindle motor 3.

The spindle motor 3 functions as a rotation drive unit for rotary driving the disk 100 transported by the tray 2. The spindle motor 3 is fixed to a motor base not shown in the figures, and arranged facing an approximately center portion of the disk accommodation unit 10 of the tray 2 transported to the disk mounting position. At the top end of the rotation axis of the spindle motor 3, the turntable 12 is provided, and on the turntable 12, the disk fitting unit 12a for detachably fitting into the center hole 100c of the optical disk 100 is provided.

When the tray 2 is transported to the disk mounting position, the motor base is elevated by an elevating mechanism not shown in the figures, and the spindle motor 3 and the turntable 12 are moved upward. The disk fitting unit 12a of the turntable 12 is fitted into the center hole 100c of the disk 100, and the disk 100 is elevated by a predetermined distance from the disk accommodation unit 10. In this way, the disk 100 becomes rotatable with the turntable 12 in an integrated manner, and the disk 100 is rotated by a rotation of the spindle motor 3.

When the spindle motor 3 is lowered by the elevating mechanism, the disk fitting unit 12a of the turntable 12 escapes downward from the center hole 100c of the disk 100. In this way, the turntable 12 departs from the disk 100, and the disk 100 is placed on the disk accommodation unit 10. In this state, when the tray 2 is moved apart from the spindle motor 3 by the tray moving mechanism, the top end of the tray 2 protrudes from the housing by a predetermined distance.

The chucking unit 14 is provided above the spindle motor 3, and the chucking unit 14 presses down the disk 100 elevated by the elevation of the spindle motor 3. In this way, the disk 100 is sandwiched by the chucking unit 14 and the turntable 12, and even when the disk 100 is rotated by the spindle motor 3, the disk 100 does not escape from the turntable 12.

The recording/reproducing unit 5 records/reproduces data to/from the recording surface 100b of the disk 100 rotated by the spindle motor 3. The recording/reproducing unit 5 includes an optical pickup 16, a pickup base 17 on which the pickup 16 is mounted, and the two first guide shafts 18a,18b for guiding the pickup base 17 in the radial direction of the disk 100, and the like.

The pickup 16 emits laser light onto the recording surface 100b of the disk 100 to record data, and/or receives laser light reflected from the recording surface 100b to reproduce data preliminarily recorded on the recording surface 100b.

The pickup 16 includes a light source, an object lens, a two-axis actuator, and a light detector. The light source includes, for example, a laser diode, and emits laser light. The object lens focuses the laser light emitted from the light source, and emits the laser light onto the recording surface 100b of the disk 100. The two-axis actuator causes the object lens to face the recording surface 100b of the disk 100. The light detector includes, for example, a photodiode, and receives the laser light reflected from the recording surface 100b of the disk 100 to read data recorded on the recording surface 100b.

The pickup 16 is mounted on the pickup base 17, and moved with the pickup base 17 in an integrated manner. The first guide axes 18a and 18b arranged in the radial direction of the disk 100 are slidably inserted in the pickup base 17. The pickup base 17 is configured to be able to move along the first guide axes 18a and 18b by a pickup moving mechanism having a pickup motor, and, when the pickup base 17 moves, recording and/or reproducing of data to/from the recording surface 100b of the disk 100 are performed by the pickup 16.

The pickup mechanism includes, for example, a lead screw mechanism, a rack-and-pinion mechanism, a belt conveying mechanism, and a wire conveying mechanism.

The print unit 6 prints visible information on the printing surface 100a of the rotated disk 100. The print unit 6 includes the print head 20, two second guide shaft 22a,22b, an ink cartridge group 23, a head cap 24, a suction pump 25, a waste ink absorbing unit 26, and a blade 27.

The print head 20 is arranged facing the printing surface 100a of the disk 100, and, in the print head 20, a plurality of nozzles 30 are provided on a surface facing the printing surface 100a. The nozzles 30 constitute a plurality of nozzle lines arranged on two or more lines out of the base line B corresponding to the radial direction (radial direction of an circle drawn by the rotating disk 100) of the disk 100 and one or more offset lines O parallel to the base line B. The nozzle lines are set to discharge ink drops of a predetermined color. The details of the print head 20 will be described below.

The nozzles 30 includes the nozzle line 31a for cyan (C), the nozzle line 31b for magenta (M), the nozzle line 31c for yellow (Y), and the nozzle line 31d for black (K). The nozzles 30 perform dummy-discharges before printing, after printing, and at other times, in order to discharge thickened inks, bubbles, foreign objects, and the like.

The print head 20 is held slidably to the second guide shafts 22a, 22b made of two guide shafts parallel to each other, and configured to be able to move along the second guide shafts 22a,22b by a head moving mechanism having a head drive motor 36 functioning as a head drive unit. One end of each guide shaft 22a,22b is fixed to the guide shaft support member 37 extended in the direction crossing the moving direction of the tray 2, and the other end is extended in the direction opposite to the moving direction of the tray 2. When the print head 20 does not perform printing on the disk 100, the print head 20 is moved by the head moving mechanism, and retracts to a standby position outside of the disk 100 in the radial direction.

The head moving mechanism includes, for example, a lead screw mechanism, a rack-and-pinion mechanism, a belt conveying mechanism, and a wire conveying mechanism. The head moving mechanism can move the print head 20 in the radial direction of the disk 100, for example, with an accuracy of about ±10 μm for a dot pitch p=43.2 μm.

The ink cartridge group 23 includes an ink cartridge 23a for cyan (C), an ink cartridge 23b for magenta (M), an ink cartridge 23c for yellow (Y), and an ink cartridge 23d for black (K). The ink cartridges 23a to 23d provide inks to the nozzles 30 of corresponding nozzle lines 31a to 31d respectively.

Each of the ink cartridges 23a to 23d has a hollow container, and stores ink by a capillary force of a porous body contained in the container. The openings of the ink cartridges 23a to 23d are detachably connected to the connecting units 38a to 38d respectively, and connected to the nozzles 30 of the nozzle lines 31a to 31d via the connecting units 38a to 38d respectively.

The head cap 24 is provided at the standby position of the print head 20, and attached to a surface on which a nozzle 30 is mounted of the print head 20 moved to the standby position. The head cap 24 prevents the ink contained in the print head 20 from drying, and also prevents dust and dirt from attaching to the nozzles 30. The head cap 24 includes a porous layer, and temporarily holds inks discharged by the dummy discharge from the nozzles 30 of the nozzle lines.

The suction pump 25 is connected to the head cap 24 via the tube 39a. The suction pump 25 generates a negative pressure in an internal space of the head cap 24, when the head cap 24 is attached to the print head 20. In this way, inks in the nozzles 30 are absorbed, and the inks discharged from the nozzles 30 by the dummy discharge and temporarily held by the head cap 24 are absorbed. The waste ink absorbing unit 26 is connected to the suction pump 25 via the tube 39b, and accommodates the inks absorbed by the suction pump 25.

The blade 27 is arranged between the standby position and the print position of the print head 20. The blade 27 contacts the top end surface of the nozzle 30 and sweeps away dust, dirt, ink, and the like attached to the top end surface, when the print head 20 moves between the standby position and the print position.

[Configuration of Control Circuit]

Figure 3:
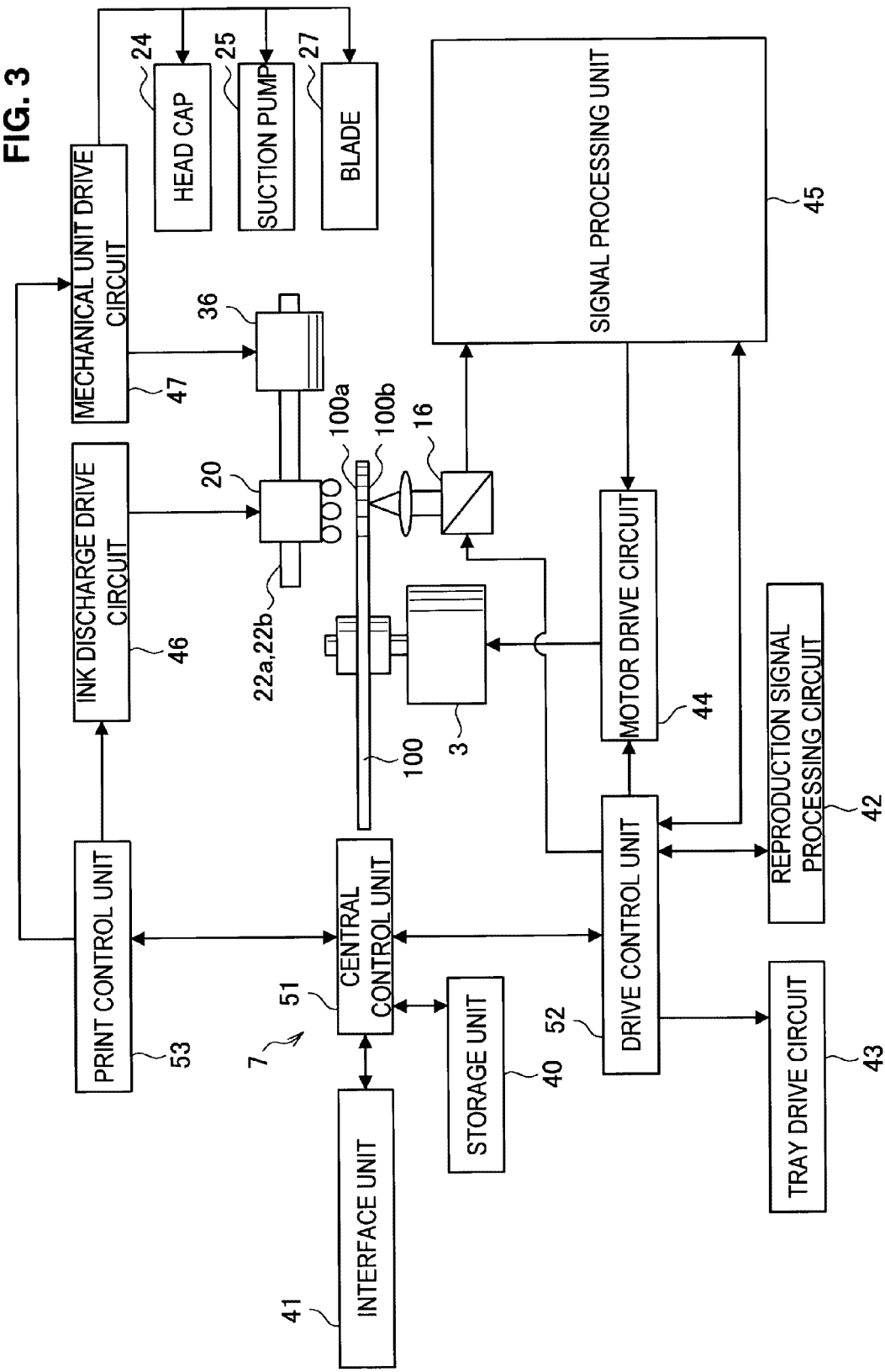
FIG. 3 is a block diagram showing a main configuration of a control circuit of the disk apparatus.

Next, with reference to FIG. 3, a configuration of the control circuit of the disk apparatus 1 will be described. FIG. 3 is a block diagram showing a main configuration of the control circuit of the disk apparatus 1.

The control circuit of the disk apparatus 1 includes the control unit 7, a storage unit 40, an interface unit 41, a reproduction signal processing circuit 42, a tray drive circuit 43, a motor drive circuit 44, a signal processing unit 45, an ink discharge drive circuit 46, and a mechanical unit drive circuit 47.

The interface unit 41 is a connecting unit for electrically connecting an external apparatus such as a personal computer to the disk apparatus 1. The interface unit 41 outputs a signal provided from the external apparatus to the control unit 7, and outputs a reproduction data read from the recording surface 100b of the disk 100 by the recording/reproducing unit 5 to the external apparatus. The signal provided from the external apparatus to the interface unit 41 is, for example, a recording data signal representing data to be recorded to the recording surface 100b of the disk 100, and a printing data signal representing visible information to be printed on the printing surface 100a of the disk 100.

The storage unit 40 stores a control program executed by the control unit 7 and various data necessary for executing the control program. The control unit 7 has a central control unit 51, a drive control unit 52, and a print control unit 53, and controls and drives the recording/reproducing unit 5, the print unit 6, and the like.

The central control unit 51 reads the control program executed by the drive control unit 52 and the print control unit 53 from the storage unit 40, and outputs the control program to the drive control unit 52 and print control unit 53. Also, the central control unit 51 outputs the recording data signal provided from the interface unit 41 to the drive control unit 52. Furthermore, the central control unit 51 outputs the printing data signal provided from the interface unit 41 and a position data signal provided from the drive control unit 52 to the print control unit 53.

The drive control unit 52 controls rotations of the spindle motor 3 and a pickup drive motor not shown in the figures in accordance with the program provided from the central control unit 51, and controls the drive of the pickup 16. Specifically, the drive control unit 52 outputs a control signal to the motor drive circuit 44, and controls the rotations of the spindle motor 3, the pickup drive motor, and a tray drive motor via the motor drive circuit 44.

Also, the drive control unit 52 outputs a control signal to the pickup 16, and controls a track servo and a focus servo so that a light beam emitted from the pickup 16 traces a track of the disk 100.

A position data signal and a reproduction data signal are provided from the signal processing unit 45 to the drive control unit 52, and the drive control unit 52 provides the position data signal to the central control unit 51, and provides the reproduction data signal to the reproduction signal processing circuit 42.

The reproduction signal processing circuit 42 performs an encode processing, a modulation processing, and the like to the reproduction data signal provided from the drive control unit 52, and the reproduction data signal which has been processed to the drive control unit 52. The tray drive circuit 43 drives the tray drive motor based on the control signal provided from the drive control unit 52, so that the tray 2 is conveyed inside and outside the housing.

The motor drive circuit 44 drives the spindle motor 3 based on the control signal provided from the drive control unit 52, so that the disk 100 mounted on the turntable 12 of the spindle motor 3 is rotary driven. The motor drive circuit 44 drives the pickup drive motor based on the control signal provided from the drive control unit 52, so that the pickup 16 is moved with the pickup base 17 in an integrated manner in the radial direction of the disk 100.

The signal processing unit 45 performs a demodulation processing, an error detection processing, and the like to an RF signal provided from the pickup 16, and generates the reproduction data signal. The signal processing unit 45 detects a signal having a specific pattern such as a synchronization signal and the like, and the position data signal showing position data of the disk 100, based on the RF signal. The position data signal is, for example, a rotation angle signal showing a rotation angle of the disk 100, a rotation position signal showing a rotation position of the disk 100, and the like.

The print control unit 53 controls the print unit 6 including the print head 20, the head drive motor 36, and the like, in accordance with the program provided from the central control unit 51, and makes the print unit 6 perform printing on the printing surface 100a of the disk 100. The print control unit 53 obtains visible information by the print data signal provided from the central control unit 51, and generates ink discharge data based on the visible information. The print control unit 53 generates a control signal for controlling the print unit 6 based on the ink discharge data and the position signal data provided from the central control unit 51, and outputs the control signal to the ink discharge drive circuit 46 and the mechanical unit drive circuit 47.

The ink discharge drive circuit 46 drives the print head 20 based on the control signal provided from the print control unit 53. In this way, ink drops are discharged from each of the nozzles 30 of the nozzle lines 31a to 31d provided in the print head 20, and the ink drops are dropped onto the printing surface 100a of the rotating disk 100. The mechanical unit drive circuit 47 drives the head cap 24, the suction pump 25, the blade 27, and the head drive motor 36 based on the control signal provided from the print control unit 53. The print head 20 is moved in the radial direction of the disk 100 by the drive of the head drive motor 36.

[Printing Method]

Figure 4:
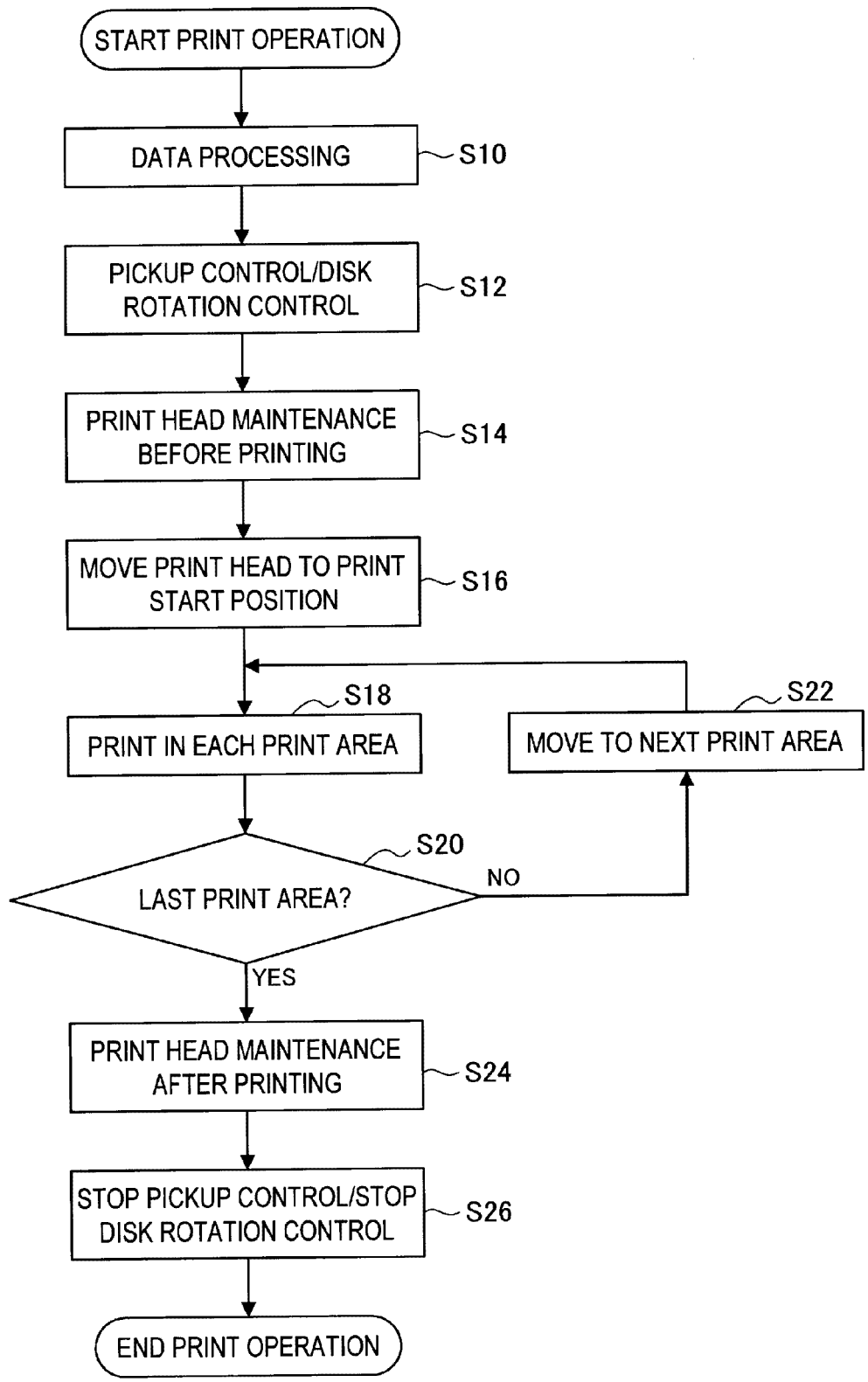
FIG. 4 is a flowchart showing a flow of a printing processing of the disk apparatus.
Figure 5:
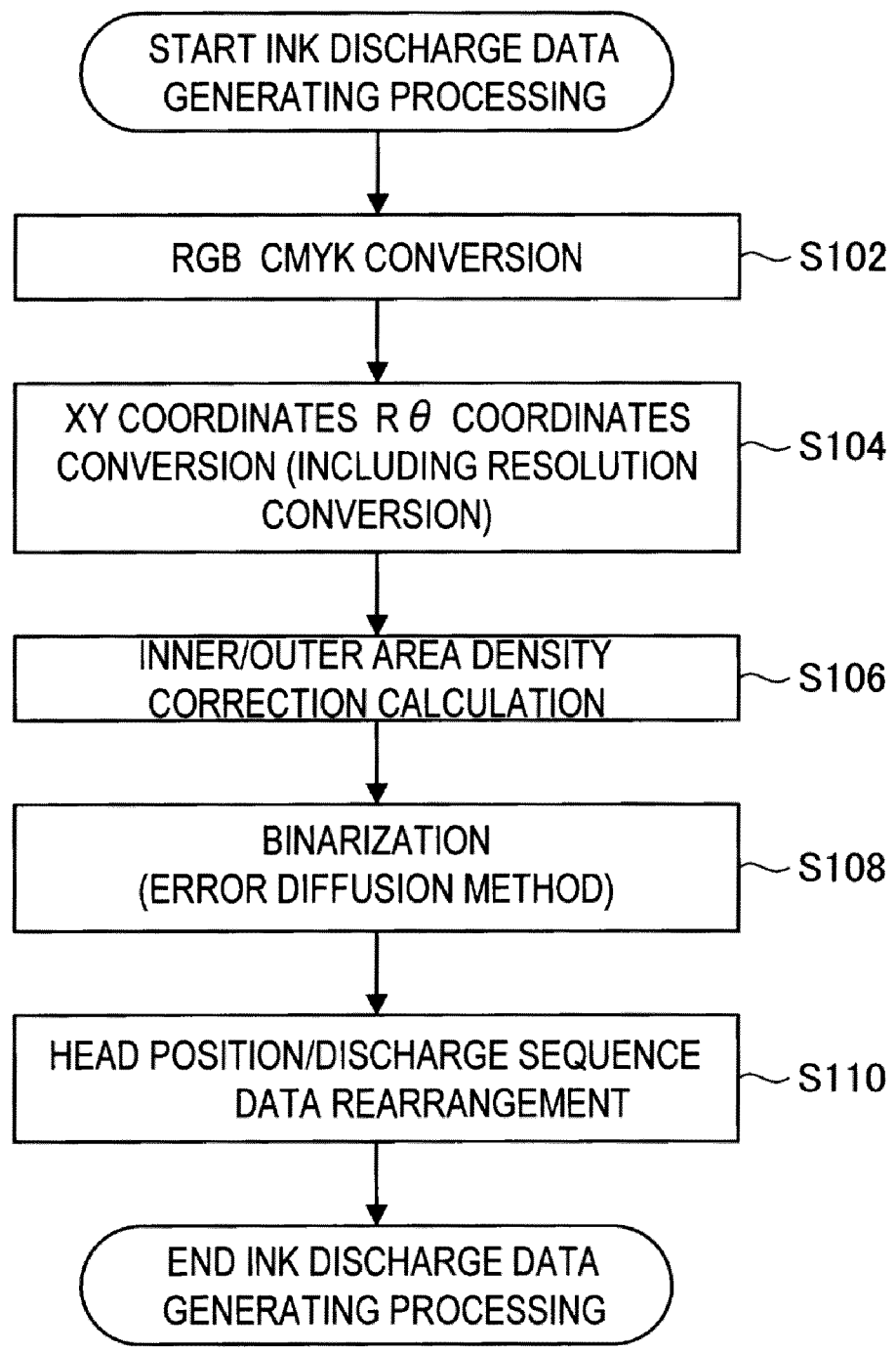
FIG. 5 is a flowchart showing a flow of a generating processing of ink discharge data.

Next, with reference to FIGS. 4 and 5, a printing method of the disk apparatus 1 of an embodiment of the present invention will be described. FIG. 4 is a flowchart showing a flow of a printing processing of the disk apparatus 1, and FIG. 5 is a flowchart showing a flow of a generating processing of ink discharge data.

On starting the printing processing, first, the disk apparatus 1 performs a data processing including the generating processing of ink discharge data described below (step S10).

The visible information used for generation of the ink discharge data is image data represented by distributing a plurality of dots whose colors are divided into R (red), G (green), B (blue) on a two-axis orthogonal coordinate system (XY coordinate system). Each dot has a gradation value representing brightness of each color. The visible information is stored in, for example, the recording surface 100b of the disk 100 and an external apparatus other than the disk apparatus 1, and input into the print control unit 53 via the central control unit 51.

In the generating processing of ink discharge data, first, the print control unit 53 converts image data represented by gradation values of each color of R, G, B into CMYK data represented by a distribution of dots (pixels) of each color of C (cyan), M (magenta), Y (yellow), and K (black).

The CMYK data is divided into C data, M data, Y data, and K data. The C data is represented by a distribution of a plurality of pixels for which cyan is set, and the M data is represented by a distribution of a plurality of pixels for which magenta is set. In the same way, the Y data is represented by a distribution of a plurality of pixels for which yellow is set, and the K data is represented by a distribution of a plurality of pixels for which black is set. Each of dots representing the CMYK data has a gradation value, for example, from 0 to 255 (8 bits), based on the image data.

In the processings of step S104 and later steps are performed for the divided C data, M data, Y data, and K data. Therefore, in the processings of step S104 and later steps, a processing to the CMYK data means a processing to each of the C data, M data, Y data, and K data.

Next, the print control unit 53 converts the CMYK data represented by a two-axis orthogonal coordinate system into polar coordinate data represented by a polar coordinate system (Rθ coordinate system) (S104). Here, the print control unit 53 converts the resolution of the CMYK data by using a nearest neighbor method, a bi-linear method, a high cubic method, and the like, and generates polar coordinate data corresponding to the size of the printing surface 100a of the disk 100.

Although details are described later, in the printing method of this embodiment, the printing is performed while the print head 20 is moved minutely in the radial direction of the disk 100. Therefore, the print control unit 53 may convert the CMYK data into the polar coordinate system taking into consideration the minute movement of the print head 20.

Next, the print control unit 53 performs an inner/outer area density correction calculation to the polar coordinate data (S106). Specifically, the print control unit 53 performs a dot density correction to the polar coordinate data, and generates dot correction polar coordinate data. In the dot density correction, brightness represented by a gradation value of each dot in the polar coordinate data is adjusted based on a weighted value for correction.

Next, the print control unit 53 binarizes the dot correction polar coordinate data by using an error diffusion method, and generates the binarized polar coordinate data (S108). The binarized polar coordinate data is data showing whether an ink drop is dropped or not to a position corresponding to each dot on the printing surface 100a of the disk 100.

The gradation value of each dot of the dot correction polar coordinate data is represented by 0 to 255 (8 bits), and the gradation value of each dot of the binarized polar coordinate data obtained by binarizing the dot correction polar coordinate data is represented by 0 or 1 (1 bits). When the gradation value of a dot of the binarized polar coordinate data is 1, an ink drop is dropped to the corresponding position of the printing surface 100a, and when the gradation value is 0, the ink drop is not dropped.

Next, the print control unit 53 rearranges the data in accordance with the position of the print head 20 (S110). Specifically, the ink discharge data is rearranged in accordance with the number of nozzles in a nozzle line provided in the print head 20. This is because an area where the nozzle lines can perform printing is smaller than the entire area of the printing surface 100a, so that the print head 20 needs to be moved in the radial direction of the disk 100 when performing printing to the entire area of the printing surface 100a.

Although details are described later, in printing methods of some embodiments, instead of performing printing sequentially to continuous print positions in the rotation direction of the disk 100, the printing are performed at print positions of a predetermined period. In this case, the print control unit 53 rearranges the ink discharge data corresponding to the actual print sequence.

When the data processing is completed, the disk apparatus 1 starts control of pickup 16 and rotation control of the disk 100 (S12). Also, the disk apparatus 1 performs a maintenance processing before printing to the print head 20 (S14).

Here, the printing surface 100a of the disk 100 is divided into a plurality of print areas 0, 1, ..., L which have concentric ring shapes continuous in the radial direction of the disk 100, in accordance with the number of nozzles in a nozzle line (the length of the nozzle line; also called "nozzle line width"). While the disk 100 is rotated, the printing is performed to each of the print areas 0, 1, ..., L at sequential print timings 0, 1, ..., N.

The disk apparatus 1 starts the printing processing, for example, in a state in which the print head 20 is moved to the print start position corresponding to the print area 0 (S16). First, the disk apparatus 1 rotates the disk 100, and performs printing to the print area 0 at sequential print timings 0, 1, ..., N (S18).

Specifically, the print control unit 53 generates a control signal based on the ink discharge data, and outputs the control signal to the ink discharge drive circuit 46. In this way, ink drops are discharged from each of the nozzles 30 of the nozzle line to the rotating disk 100, and visual information is printed to the printing positions corresponding to each print timing.

Next, the disk apparatus 1 moves the print head 20 sequentially to the positions corresponding to adjacent print areas 1, 2, ..., L (S22) and performs printing to each of the print areas 1, 2, ... L at sequential print timings 0, 1, ..., N, until the printing to the last print area L is completed (S20). When the printing to the print area L is completed (S20), the disk apparatus 1 performs a maintenance processing after printing to the print head 20 (S24). Thereafter, the disk apparatus 1 stops the control of pickup 16 and the rotation control of the disk 100 (S26), and terminates the printing processing.

[Configuration of Print Head 20]

Figure 6:
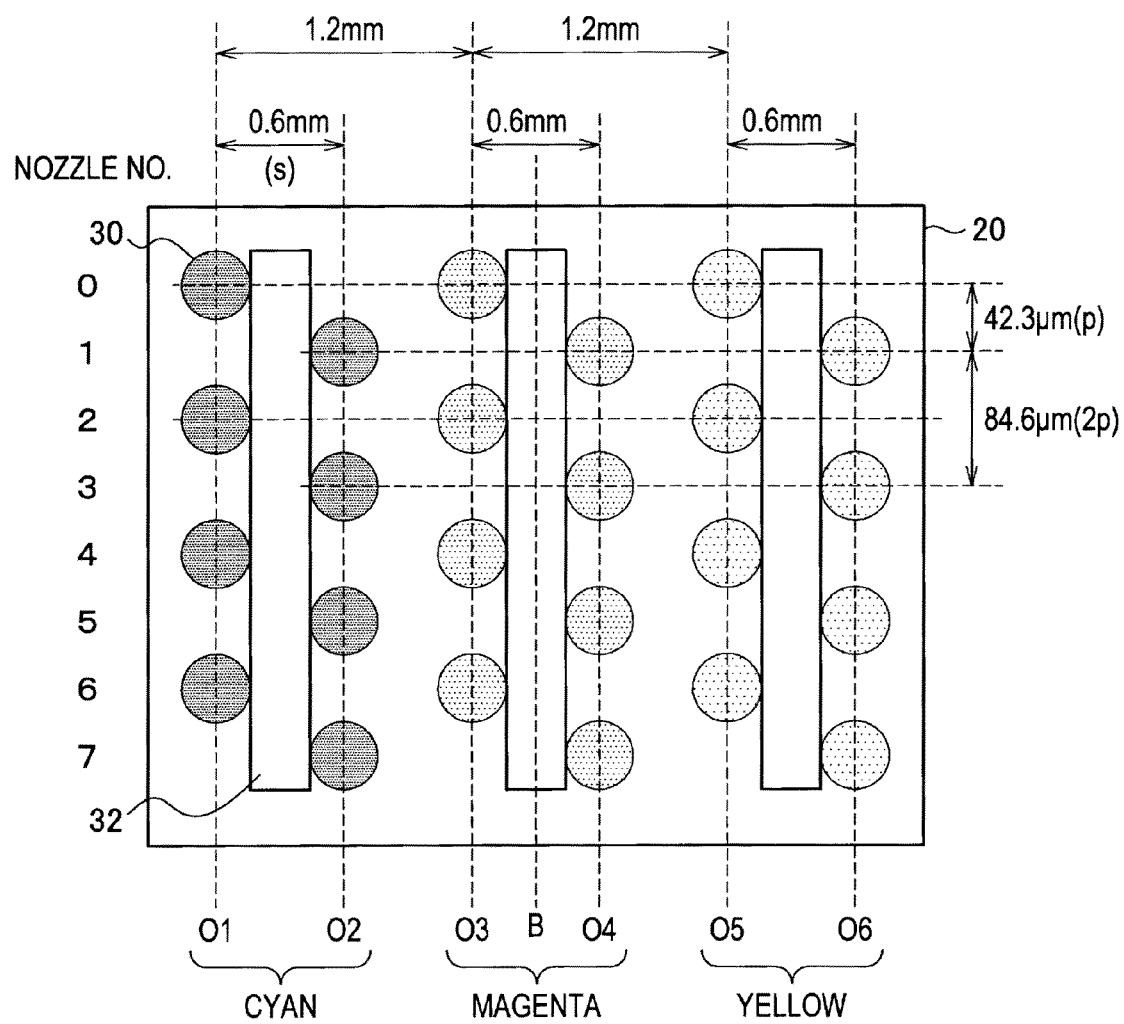
FIG. 6 is a schematic view showing a print head of the disk apparatus.

Next, with reference to FIG. 6, the printing method 20 of the disk apparatus 1 of an embodiment of the present invention will be described. FIG. 6 is a schematic view showing the print head 20 of the disk apparatus 1.

The print head 20 has a plurality of nozzles 30, and the plurality of nozzles 30 constitute nozzle arrays of each color of cyan (C), magenta (M), and yellow (Y). Hereinafter, the nozzle array of black (K) is not described for convenience of description. Each of the nozzle arrays of the three colors includes two nozzle lines arranged with a nozzle line pitch s=0.6 mm and having the ink providing channel 32 in between. Each nozzle line includes a plurality of nozzles 30 arranged with a pitch 2p=84.6 μm. The nozzle array of each color includes a plurality of nozzles 30 arranged in a zigzag arrangement with a nozzle pitch p=42.3 μm.

As shown in FIG. 6, the cyan nozzle lines are arranged on the offset lines $O_1$, $O_2$, the magenta nozzle lines are arranged on the offset lines $O_3$, $O_4$, and the yellow nozzle lines are arranged on the offset lines $O_5$, $O_6$. In FIG. 6, the nozzle numbers 0, 1, ..., 7 are given to the plurality of nozzles 30 constituting nozzle lines of each color, in order from the nozzle 30 arranged on the outer circumference side of the disk 100 (upper side of FIG. 6) to the nozzle 30 arranged on the inner circumference side (lower side of FIG. 6).

When the plurality of nozzles 30 are arranged in a zigzag arrangement, a predetermined distance between adjacent nozzles 30 (for example, nozzles 30 of nozzle numbers 0 and 2) is secured, compared with a case in which the nozzles 30 are not arranged in a zigzag arrangement and the same resolution is obtained. In this way, working accuracy required when the print head 20 is manufactured can be decreased, and structural strength of the print head 20 can be increased.

[Print Defect]

Figure 7:
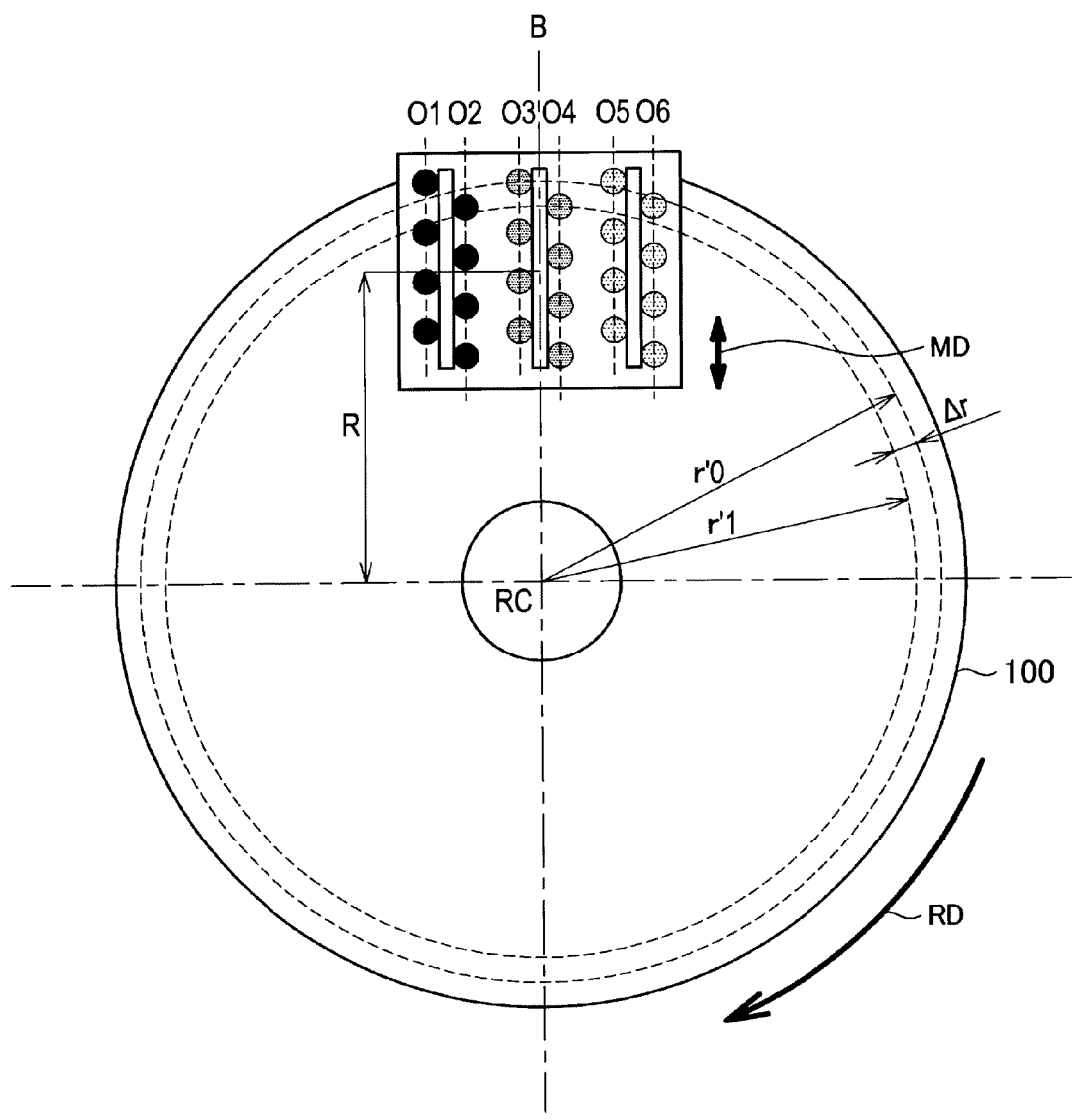
FIG. 7 is a view schematically showing a positional relationship between a print head of Rθ scanning method and a disk.
Figure 8:
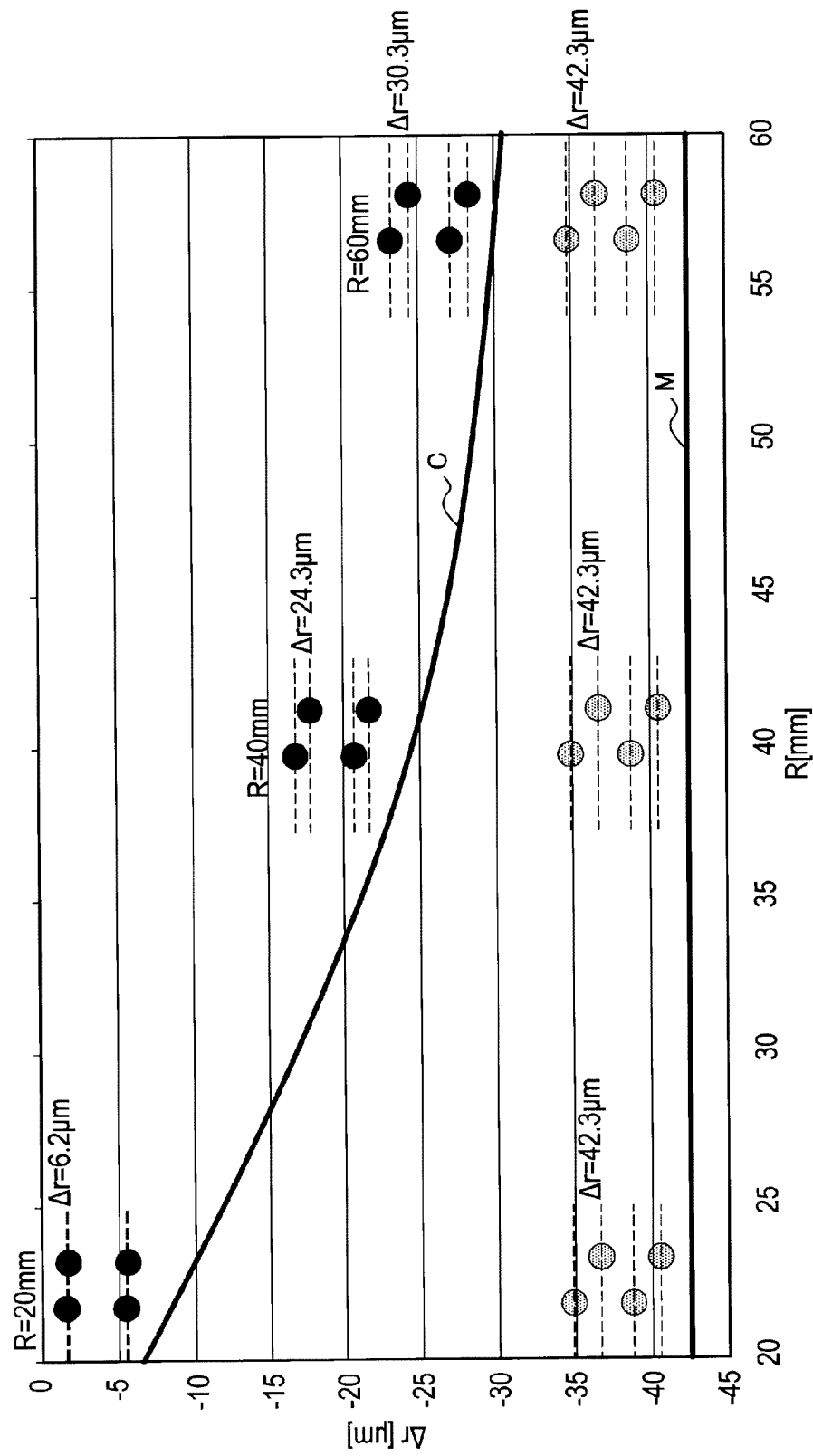
FIG. 8 is a graph showing clearances between paths through which neighboring nozzles facing each other pass over the disk.

Next, with reference to FIGS. 7 and 8, a print defect occurring when using the print head 20 of Rθ scanning method having a plurality of nozzle lines will be described. FIG. 7 is a view schematically showing a positional relationship between the print head 20 of Rθ scanning method and the disk 100. FIG. 8 is a graph showing clearances between paths through which neighboring nozzles facing each other pass over the disk 100.

In the print head 20 of Rθ scanning method, at least two nozzle lines are arranged for each color on at least two lines out of the base line B corresponding to the radial direction of the rotating disk 100 and one or more offset lines O parallel to the base line B. In a case shown in FIG. 7, on the six offset lines $O_1$ to $O_6$ parallel to the base line B, two nozzle lines for each color, cyan, magenta, and yellow, are arranged, so that, six nozzle lines are arranged in total.

In a case shown in FIGS. 6 and 7, each of the two cyan nozzle lines is arranged on the offset lines $O_1$, $O_2$ respectively which are offset leftward from the base line B by 2.5 s=1.5 mm and 1.5 s=0.9 mm. Each of the two magenta nozzle lines is arranged on the offset lines $O_3$, $O_4$ respectively which are offset leftward and rightward from the base line B by s/2=0.3 mm. Each of the two yellow nozzle lines is arranged on the offset lines $O_5$, $O_6$ respectively which are offset rightward from the base line B by 1.5 s=0.9 mm and 2.5 s=1.5 mm.

In an arrangement state shown in FIG. 7, the print head 20 moves over the rotating disk 100 (in FIG. 7, shown as the rotation direction of the disk 100 is shown by a rotation arrow RD) in the radial direction (in FIG. 7, the radial direction is shown by an arrow MD) of the disk 100. In this way, when the print head 20 moves, each of the two cyan nozzle lines moves on the offset lines $O_1$, $O_2$ respectively which are offset leftward from the base line B by 1.5 mm and 0.9 mm, and each of the two magenta nozzle lines moves on the offset lines $O_3$, $O_4$ respectively which are offset leftward and rightward from the base line B by 0.3 mm.

In FIG. 8, regarding the cyan nozzle lines and the magenta nozzle lines, clearances (differences between radiuses) Δr between the paths through which the neighboring nozzles (nozzles 30 of nozzle numbers 0 and 1) facing each other over the disk 100 pass are shown by the curve M and the curve C, respectively. In FIG. 8, clearances Δr between the paths through which the neighboring nozzles of magenta and cyan facing each other pass are shown in the vertical axis, and the center position R of the print head 20 is shown as a distance from the rotation center RC of the disk 100.

As shown in FIG. 8, the paths of the magenta nozzles 30 have a constant clearance Δr=p=42.3 μm, regardless of the center position R of the print head 20. Here, the distances $r_0'$, $r_1'$ from the rotation center RC of the disk 100 to the nozzles 30 of nozzle numbers 0 and 1 are $r_0'=\sqrt{(r_0^2+(0.5\ s)^2)}$, $r_1'=\sqrt{(r_1^2+(0.5\ s)^2)}$ respectively. The $r_0$, and $r_1$ are the distances from the rotation center RC of the disk 100 to the nozzles 30 of nozzle numbers 0 and 1 on the base line B. Since the distances $r_0'$ and $r_1'$ to the nozzles 30 of nozzle numbers 0 and 1 include the same offset addition terms $(0.5\ s)^2$, the paths of the magenta nozzles 30 have the constant clearance Δr, regardless of the center position R of the print head 20.

On the other hand, the paths of the cyan nozzles 30 have a clearance Δr=30.3 μm when the center position R of the print head 20 is 60 mm, a clearance Δr=24.3 μm when the center position R of the print head 20 is 40 mm, and a clearance $\Delta r=6.2$ μm when the center position R of the print head 20 is 20 mm. Here, the distances $r_0'$, $r_1'$ from the rotation center RC of the disk 100 to the nozzles 30 of nozzle numbers 0 and 1 are $r_0'=\sqrt{(r_0^2+(2.5\ s)^2)}$, $r_1'=\sqrt{(r_1^2+(1.5\ s)^2)}$ respectively.

Since the distances $r_0'$ and $r_1'$ to the nozzles 30 include different offset addition terms $(2.5\ s)^2$ and $(1.5\ s)^2$ respectively, the paths of the cyan nozzles 30 have various clearances $\Delta r$ in accordance with the center position R of the print head 20. On the inner circumference side of the disk 100 where the center position R of the print head 20 is small, ratios of the offset addition terms $(2.5\ s)^2$ and $(1.5\ s)^2$ to the radius terms $r_0^2$ and $r_1^2$ become relatively large, in the distances $r_0'$ and $r_1'$ to the nozzles 30. Therefore, regarding the paths of the cyan nozzles 30, the clearance $\Delta r$ decreases.

In this way, as it gets closer to the inner circumference of the disk 100, an overlap rate of the paths through which the neighboring nozzles facing each other pass increases. In other words, areas where there is no print dot and a substrate of the printing surface 100a is exposed increase. As a result, even when a print data having the same density is printed, unevenness of the density occurs, and when a print data is printed with full-color, irregular colors occur, so that the print quality deteriorates.

[Printing Processing of First Embodiment]

Figure 9:
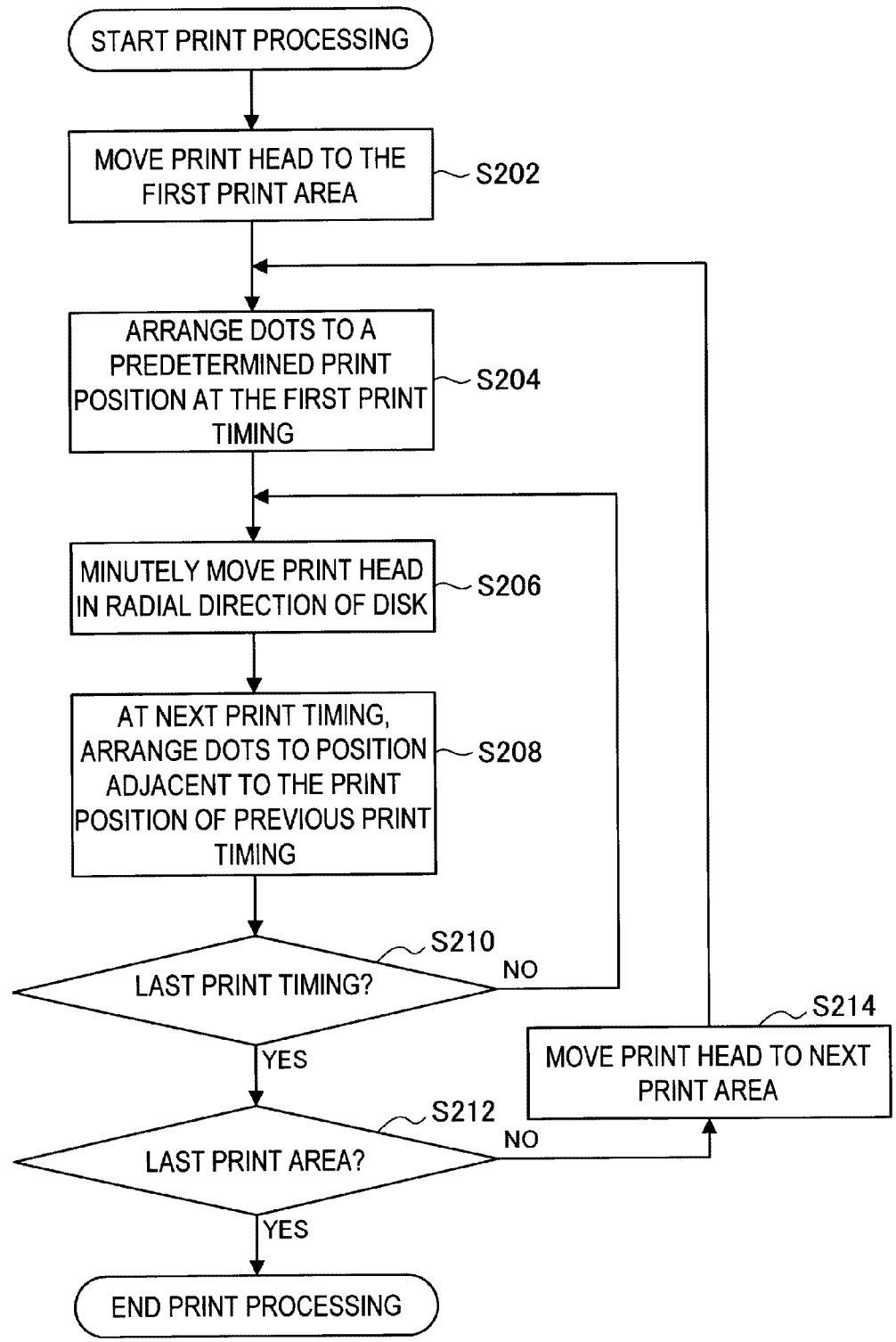
FIG. 9 is a flowchart showing a procedure of a printing processing according to the first embodiment.
Figure 10:
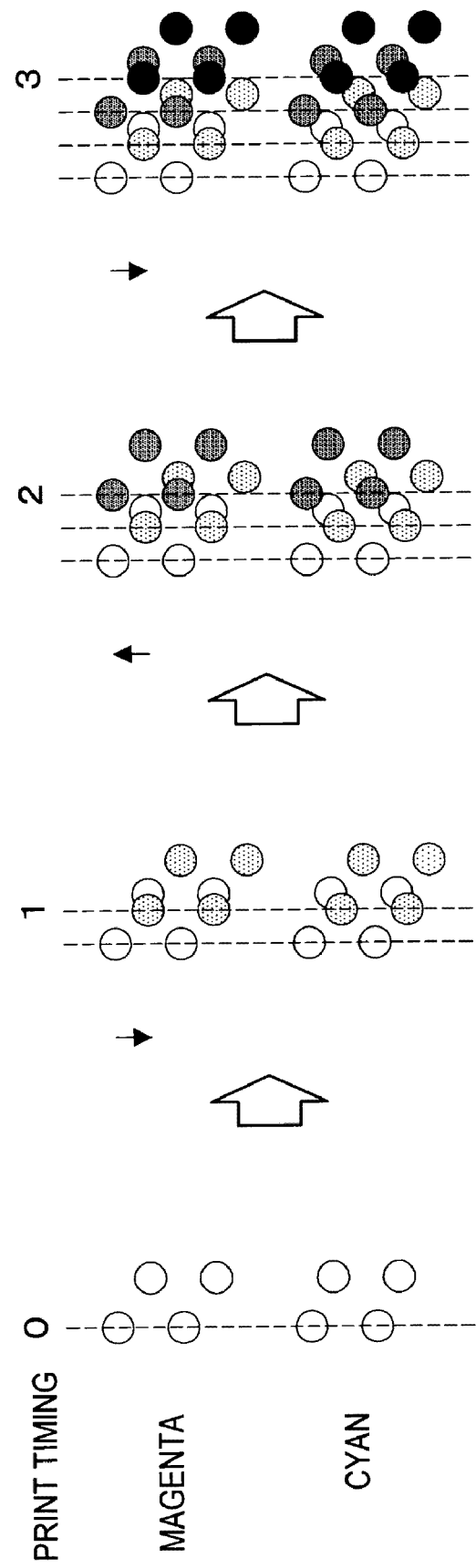
FIG. 10 is a schematic view showing the procedure of the printing processing shown in FIG. 9.
Figure 11:
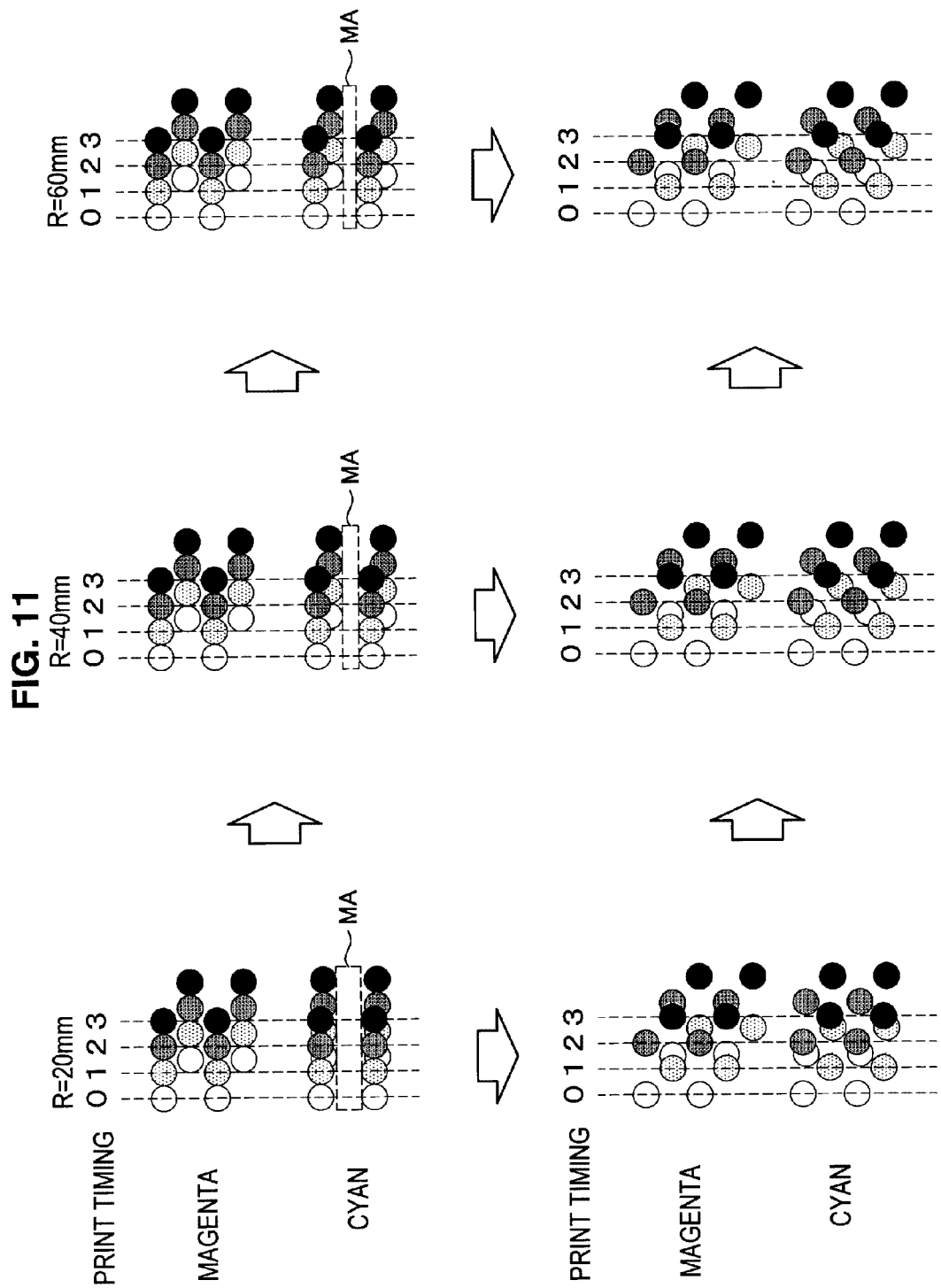
FIG. 11 is a schematic view showing arrangements of print dots when performing printing at adjacent print positions at continuous two print timings while minutely moving the print head reciprocally.

Next, with reference to FIGS. 9 and 11, a printing method of the first embodiment of the present invention for eliminating the above described print defects will be described. FIG. 9 is a flowchart showing a procedure of the printing processing of the first embodiment. FIG. 10 is a schematic view showing the procedure of the printing processing shown in FIG. 9. FIG. 11 is a schematic view showing arrangements of print dots when performing printing at adjacent print positions at continuous two print timings (timings in the rotation direction of the disk 100) while minutely moving the print head 20 reciprocally.

Figure 12:
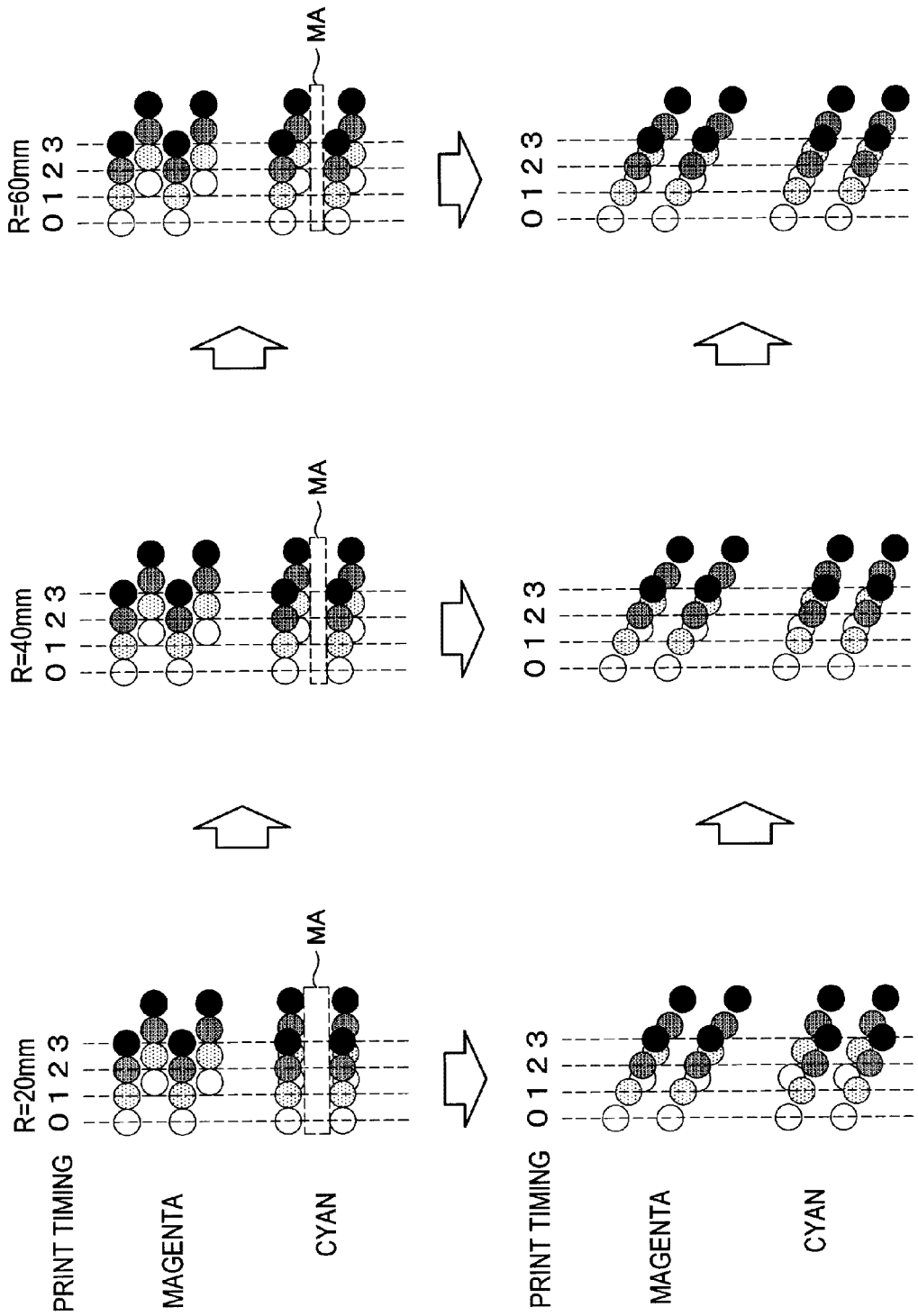
FIG. 12 is a schematic view showing arrangements of print dots when performing printing at adjacent print positions while moving the print head at continuous print timings and returning the print head to the original position once in every four continuous print timings.
Figure 13:
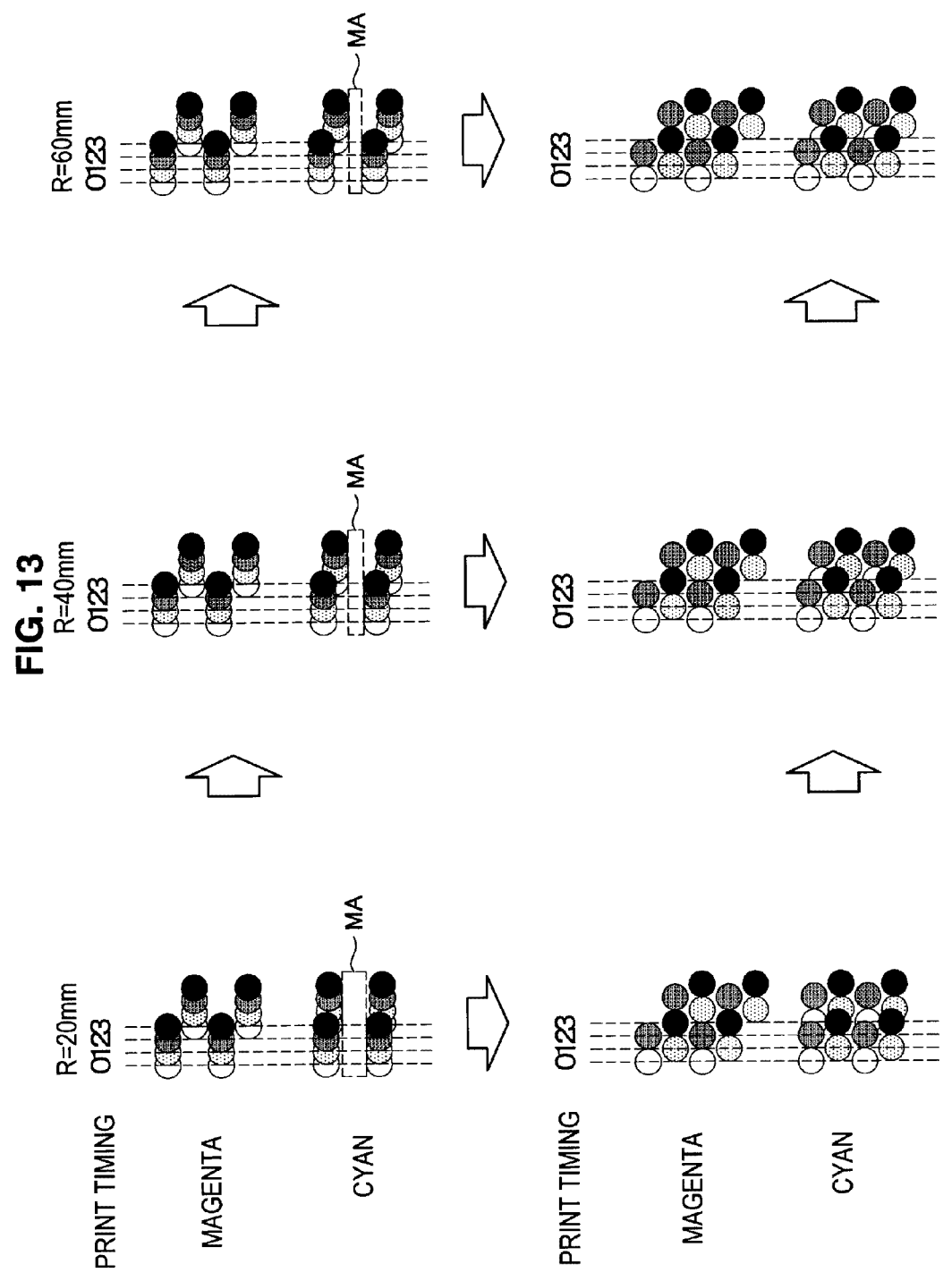
Figure 14:
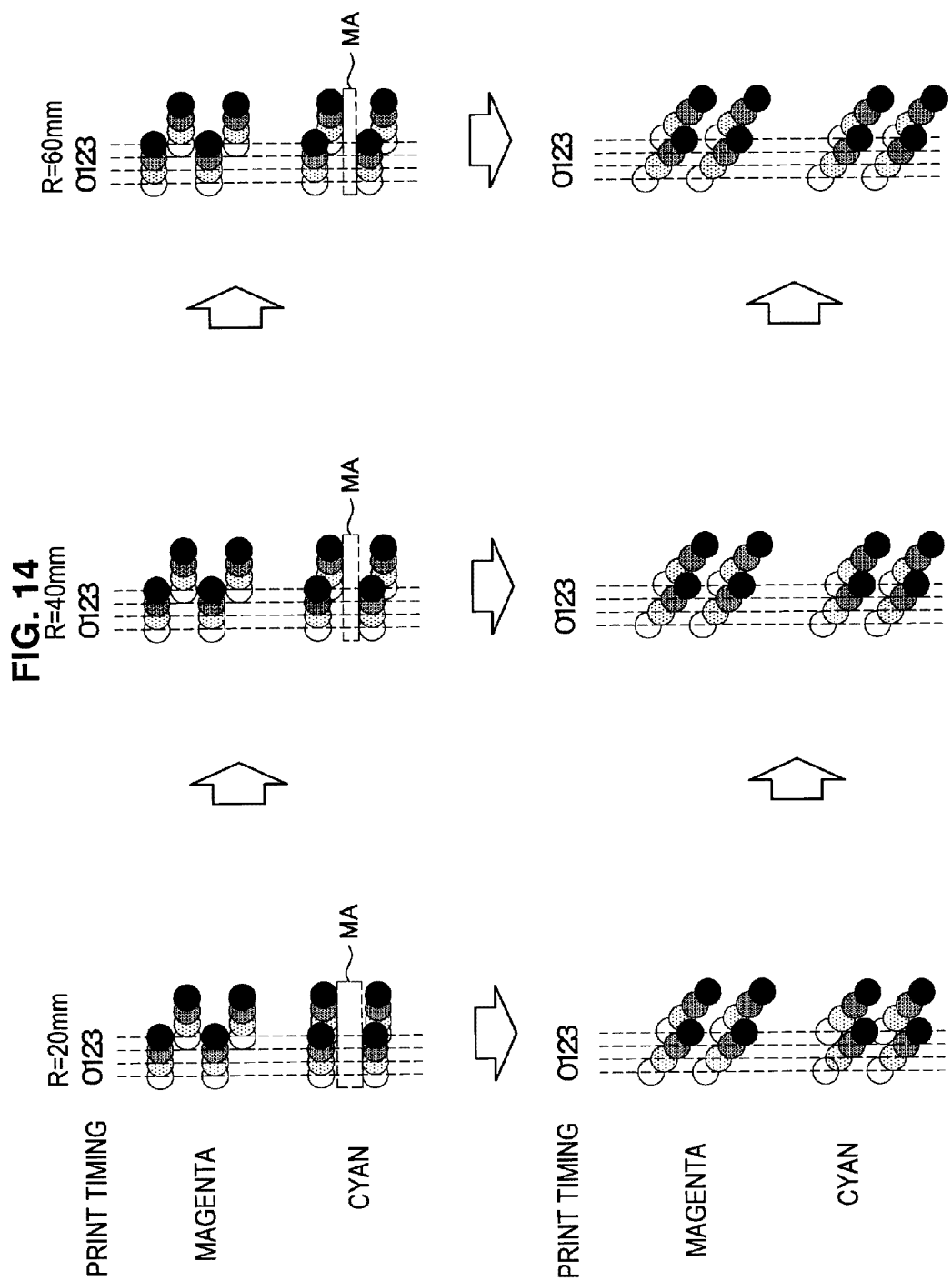
FIG. 14 is a schematic view showing arrangements of print dots when performing printing in which a resolution in the disk rotation direction is twice as high as that of the case shown FIG. 12.

In FIGS. 10 and 11, for convenience of description, only the print dot arrangements corresponding to the nozzles 30 of nozzle numbers 0 to 3 constituting nozzle lines of magenta and cyan are shown. In FIGS. 10 and 11, print dots arranged at the same print timing are represented by the same hatching pattern. In the upper part of FIG. 11, print dot arrangements of a printing method in related art are shown for comparison, and in the lower part of the figure, print dot arrangements of the printing method of this embodiment are shown. Also, in FIG. 11, print dot arrangements in cases when the center position R of the print head 20 is 20 mm, 40 mm, and 60 mm are shown respectively. FIGS. 12 to 14 below will be described in the same way as the above FIG. 11.

With reference to FIGS. 9 to 11, the printing method in related art and the printing method of this embodiment will be described.

In the printing method in related art, at the print timing 0, the print dots are arranged to the print positions corresponding to the print timing 0 as shown in the upper part of FIG. 11. Thereafter, at the subsequent print timings 1, 2, and 3, with rotation of the disk 100 by a predetermined rotation angle, the print dots are arranged to the print positions corresponding to the print timings 1, 2, and 3 without a minute movement of the print head 20.

Therefore, as described in FIG. 8, the clearance $\Delta r$ between the paths through which the neighboring nozzles pass is constant at the nozzle pitch p=42.3 μm for the magenta nozzle lines. However, for the cyan nozzle lines, the clearance $\Delta r$ become smaller compared with the nozzle pitch p as it gets closer to the inner circumference of the disk 100. Here, the neighboring nozzles means, for example, the nozzles 30 of nozzle numbers 0 and 1, and the nozzles 30 of nozzle numbers 2 and 3.

In this way, for the cyan nozzle lines, as the print area gets closer to the inner circumference of the disk 100, an overlap rate of the paths through which the adjacent nozzles pass increases. For example, as shown clearly in the case in which the center position of the print head 20 is 20 mm, an area MA where there is no print dot and a substrate of the printing surface 100a is exposed increase.

On the other hand, in the printing method of this embodiment, once the printing processing is started in step S16 shown in FIG. 4, the disk apparatus 1 performs the printing processing in accordance with the procedure shown in FIG. 9. The step S16 shown in FIG. 4 is shown as step S202 in FIG. 9.

First, at the print timing 0, the disk apparatus 1 arranges print dots to the print positions corresponding to the print timing 0 in the first print area 0 (S204). Next, the disk apparatus 1 minutely moves the print head 20 in the radial direction of the disk 100 (S206), and at the next print timing 1, arranges print dots to the print positions corresponding to the print timing 1 (S208). After the print timing 1, the disk apparatus 1 sequentially arranges print dots to the print positions corresponding to the print timing 2, 3, . . . N (S208), while minutely moving the print head 20 in the radial direction of the disk 100 (S206) until the last print timing N (S210).

Specifically, the print control unit 53 generates a control signal based on the ink discharge data, and outputs the control signal to the ink discharge drive circuit 46 and the mechanical unit drive circuit 47. The ink discharge drive circuit 46 drives the print head 20 based on the control signal so that ink drops are discharged from the nozzles 30 of the nozzle lines provided in the print head 20, and the ink drops are dropped onto the printing surface 100a of the rotating disk 100. The mechanical unit drive circuit 47 drives the head drive motor 36 based on the control signal so that the print head 20 is minutely moved in the radial direction of the disk 100.

When the printing to the print area 0 is completed, the disk apparatus 1 moves the print head 20 to the position corresponding to next print area 1 (S214), and performs printing in the same procedure as that for the print area 0. Furthermore, the disk apparatus 1 performs printing to the print areas 2, 3, . . . , L, in the same procedure, until the last print area L (S212).

By the above described procedure, as shown in FIG. 10, after the printing corresponding to the print timing 0 is performed at the print timing 0, the print head 20 is minutely moved in the radial direction toward the inner circumference side of the disk 100 by a dot pitch p, and the printing corresponding to the print timing 1 is performed at the print timing 1. Next, the print head 20 is minutely moved toward the outer circumference side of the disk 100 by the dot pitch p, and the printing corresponding to the print timing 2 is performed at the print timing 2. Thereafter, the print head 20 is minutely moved toward the inner circumference side of the disk 100 by the dot pitch p, and the printing corresponding to the print timing 3 is performed at the print timing 3.

Here, the print positions corresponding to the print timings 0 to 3 are continuously adjacent to one another. Therefore, at the print timings 0 to 3, the printing is performed in the print positions adjacent to one another corresponding to the print timings 0 to 3, with the print head 20 being minutely moved at each print timing. Especially, in a case shown in FIGS. 10 and 11, at the two continuous print timings, the printing is performed in the print positions adjacent to each other corresponding to each print timing, with the print head 20 being minutely moved in a reciprocal manner by the nozzle pitch p.

In this way, as shown in a lower part of FIG. 11, an overlap rate of the paths through which the adjacent nozzles pass can be decreased, and the positions where there are print dots on the printing surface 100a are spatially averaged, so that generation of the area MA where the substrate of the printing surface 100a is exposed can be suppressed.

Next, with reference to FIGS. 12 to 14, a modification of the printing method of this embodiment will be described. FIG. 12 is a schematic view showing the arrangements of print dots when performing printing at adjacent print positions while moving the print head 20 at continuous print timings and returning the print head 20 to the original position once in every four continuous print timings. FIGS. 13 and 14 are schematic views respectively showing the arrangements of print dots when printing is performed in which the resolution in the disk rotation direction is twice as high as that of the case shown in FIGS. 11 and 12 respectively.

In the modification shown in FIG. 12, after the printing corresponding to the print timing 0 is performed at the print timing 0, the print head 20 is minutely moved in the radial direction toward the inner circumference side of the disk 100 by a half of the dot pitch p, 0.5p, and the printing corresponding to the print timing 1 is performed at the print timing 1. Next, at the print timings 2 and 3, in a state in which the print head 20 is further minutely moved toward the inner circumference side of the disk 100 by 0.5p at a time, the printing corresponding to the print timings 2 and 3 is performed. Thereafter, the print head 20 is moved toward the outer circumference side of the disk 100 by 1.5p, and, in the same arrangement state of the print head 20 as that of the print timing 0, the printing corresponding to the print timing 4 is performed at the print timing 4.

In a case shown in FIG. 12, the printing is performed in the print positions adjacent to one another corresponding to each print timing, with the print head 20 being minutely moved by 0.5p at continuous print timings and being returned by 1.5p to the original position once in every four continuous print timings. In this way, it is confirmed that print quality better than that of the case shown in FIG. 11 can be acquired.

In the modifications shown in FIGS. 13 and 14, the printing is performed at the resolution in the rotation direction of the disk 100 being twice as high as that of the case shown in FIGS. 11 and 12 respectively, in other words, with the time intervals between the print timings 0 to 3 being a half. In this way, it is confirmed that print quality better than that of the case shown in FIGS. 11 and 12 can be acquired. In the case shown in FIGS. 13 and 14, since the printing processing is performed in the same procedure as that of the case shown in FIGS. 11 and 12 except that the resolution in the rotation direction of the disk 100 is high twice, the detailed description is not repeated.

As described above, according to the printing method of this embodiment, the printing is performed in a predetermined print position at the first print timing, and, after the paths of the nozzles 30 are minutely moved, the printing is performed in the print position adjacent to the print position of the first print timing at the subsequent second print timing. In this way, occurrence of print defects can be suppressed without practically increasing printing time compared with printing methods in related art.

<Second Embodiment>
[Printing Processing of Second Embodiment]

In the printing method of the first embodiment, the print head 20 is moved minutely at each print timing, and the print head 20 is moved minutely toward both of the inner circumference and the outer circumference of the disk 100. Therefore, although the printing is performed in the same printing time as that of printing methods in related art, backlash is easy to occur by moving the print head 20 minutely in a high frequency and reciprocal manner.

Figure 15:
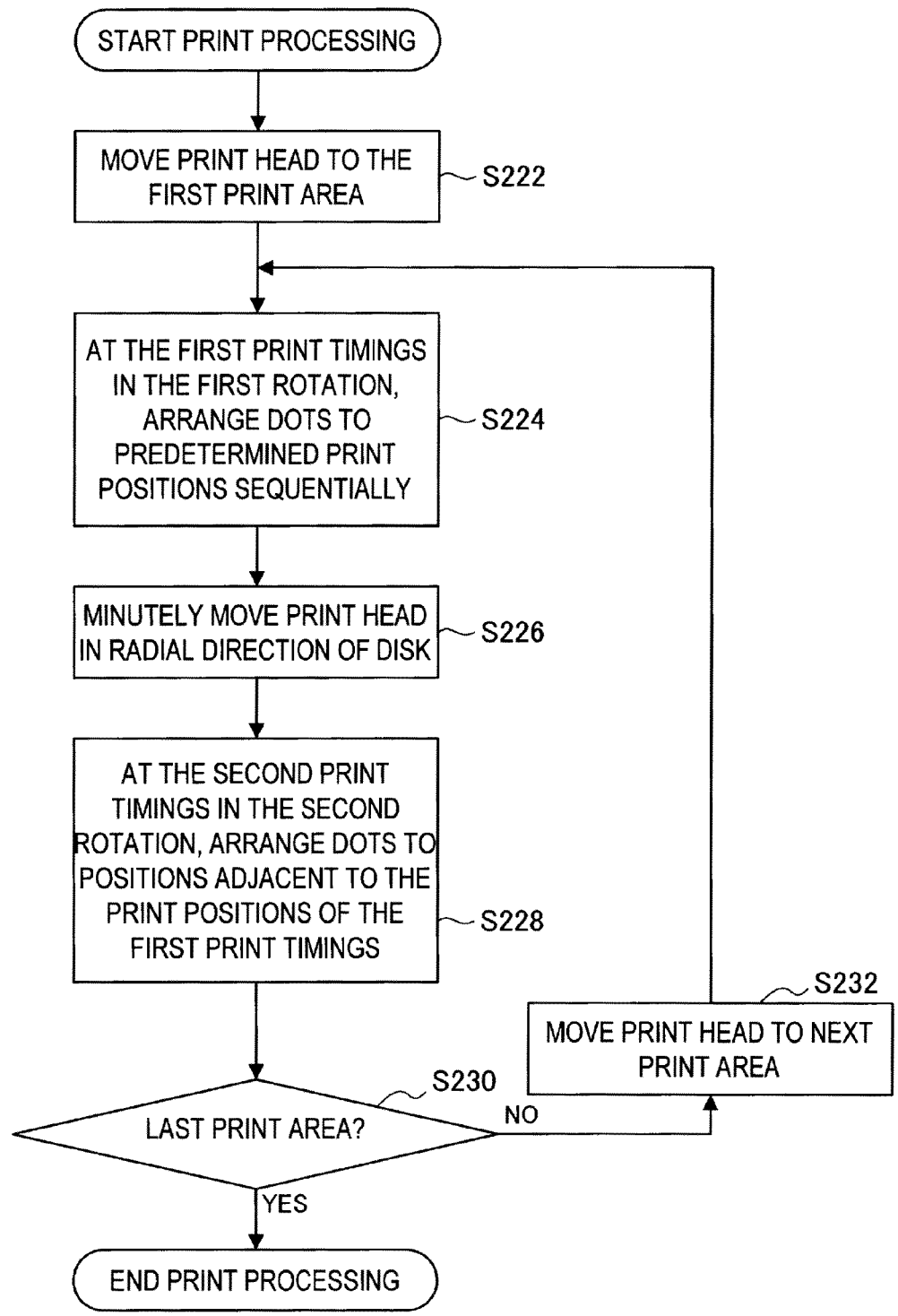
FIG. 15 is a flowchart showing a procedure of a printing processing according to a second embodiment.
Figure 16:
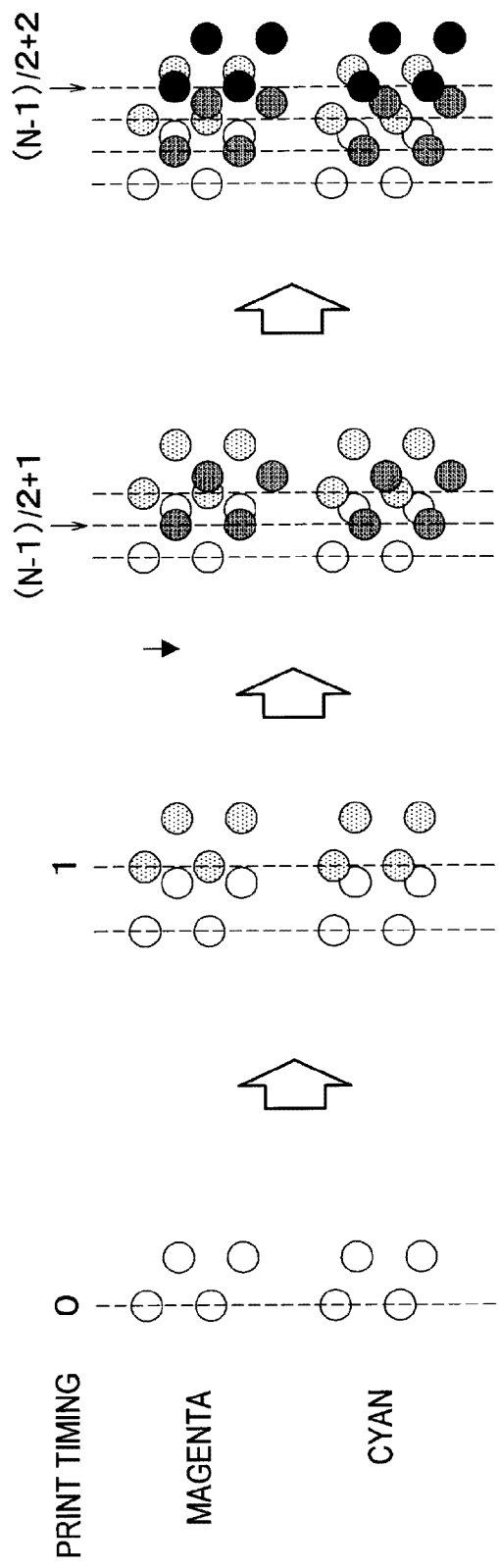
FIG. 16 is a schematic view showing the procedure of the printing processing shown in FIG. 15.

Next, with reference to FIGS. 15 and 16, a printing method of a second embodiment of the present invention will be described. FIG. 15 is a flowchart showing a procedure of the printing processing of the second embodiment. FIG. 16 is a schematic view showing the procedure of the printing processing shown in FIG. 15.

In the printing method of this embodiment, once the printing processing is started in step S16 shown in FIG. 4, the disk apparatus 1 performs the printing processing in accordance with the procedure shown in FIG. 15.

First, for example, onto the print area 0, at the print timings 0, 1, . . . , (N−1)/2,(N is an odd number) in the first rotation of the disk 100, the disk apparatus 1 arranges print dots sequentially to the print positions corresponding to each print timing (S224). Here, the print positions corresponding to the print timings 0, 1, . . . , (N−1)/2 correspond to every other position of the positions adjacent to one another described in the printing method of the first embodiment. Next, the disk apparatus 1 minutely moves the print head 20 in the radial direction of the disk 100 (by the nozzle pitch p in a case of FIG. 16) (S226), and at the print timings (N−1)/2+1,(N−1)/2+2, . . . , N in the second rotation, arranges print dots to the print positions corresponding to each print timing (S228).

Here, the print positions corresponding to the print timings (N−1)/2+1,(N−1)/2+2,N are adjacent to the print positions corresponding to the print timings 0, 1, . . . , (N−1)/2 respectively.

When the printing to the print area 0 is completed, the disk apparatus 1 moves the print head 20 to the position corresponding to next print area 1 (S232), and performs printing in the same procedure as that for the print area 0, and furthermore, the disk apparatus 1 performs printing to the print areas 2, 3, . . . , L, in the same procedure, until the last print area L (S230).

Here, the print timings have a constant period between adjacent print positions. Specifically, when assuming continuous adjacent print positions 0 to N (N: odd number), the print head 20 is moved minutely, and the printing to the print positions 1, 3, . . ., N at the print timings (N−1)/2+1, (N−1)/2+2, . . . , N is performed respectively, after the printing to the print positions 0, 2, . . . , (N−1) at the print timings 0, 1, . . . , (N−1)/2 is performed respectively.

In FIG. 16, although a case in which the print dots are arranged as shown in FIG. 11 is described, a case in which the print dots are arranged as shown in FIG. 12 is also described in the same way. When the print dots are arranged as shown in FIG. 12, the print timings have a constant period between a plurality of adjacent print positions (for example, four print positions).

Specifically, when assuming continuous adjacent print positions 0 to N (N: multiples of 4−1), after the printing is performed to the print positions 0, 4, . . . , N−3 at the print timings 0, 1, . . . , (N+1)/4−1 in the first rotation of the disk 100 respectively, the print head 20 is moved minutely. In the same way, secondly, after the printing is performed to the print positions 1, 5, . . . , N−2 at the print timings (N+1)/4,(N+1)/4+1,. . . , (N+1)/2−1 in the second rotation respectively, the print head 20 is moved minutely.

Thirdly, after the printing is performed to the print positions 2, 6, . . . , N−1 at the print timings (N+1)/2,(N+1)/2+1, . . . , (N+1)×3/4−1 in the third rotation respectively, the print head 20 is moved minutely. Fourthly, after the printing is preformed to the print positions 1, 5, . . . , N at the print timings (N+1)×3/4,(N+1)×3/4+1, . . . , N in the fourth rotation is respectively.

As described above, according to the printing method of this embodiment, the printing is performed in predetermined periodic print positions at the continuous first print timings, and, after the paths of the nozzles 30 are minutely moved, the printing is performed in the print positions adjacent to the print positions of the first print timings at the continuous second print timings. In this way, occurrence of print defects can be suppressed without moving the print head 20 minutely in a high frequency and reciprocal manner. Therefore, according to the printing method of this embodiment, backlash is not likely to occur compared with the printing method of the first embodiment.

Since the number of rotations of the disk 100 increases in the printing method of this embodiment, when the print dots are arranged as shown in FIGS. 11 and 12, the printing time becomes two times and four times longer respectively compared with methods in related art. However, the increase of the printing time can be suppressed by increasing the number of rotations of the disk 100 during printing to two times or four times greater in accordance with the discharge drive frequency of the print head 20.

<Third Embodiment>
[Printing Processing of Third Embodiment]

When the disk 100 is rotated in high speed, it may be difficult to apply the discharge frequency of ink drops to the rotating disk 100. Therefore, printing may be performed by overlapping a plurality of prints in which dots are thinned out in the rotation direction of the disk 100, in order to perform printing by discharging ink drops at a predetermined discharge frequency.

Figure 17:
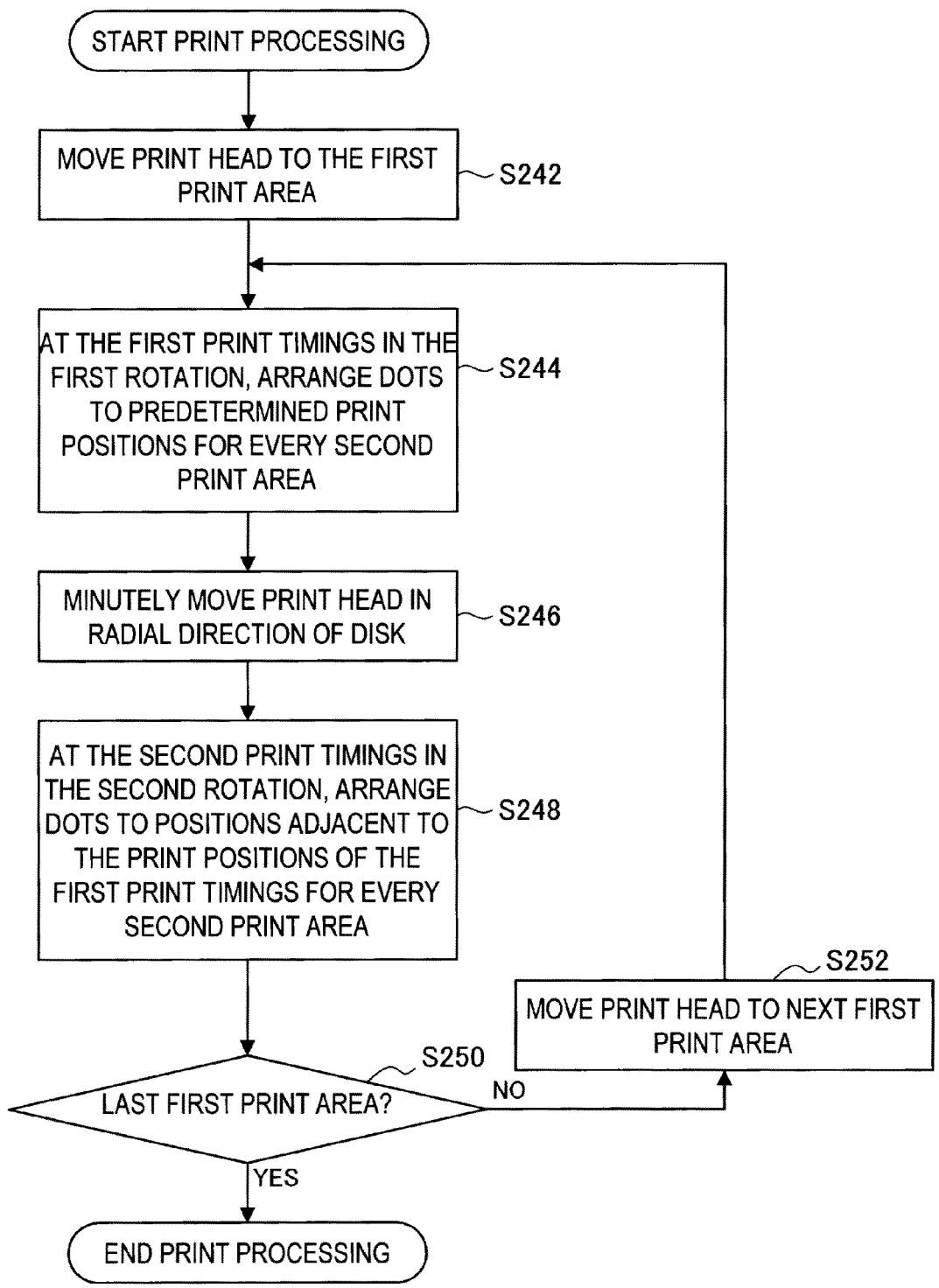
FIG. 17 is a flowchart showing a procedure of a printing processing according to a third embodiment.

Next, with reference to FIGS. 17 and 18, a printing method of a third embodiment of the present invention will be described. FIG. 17 is a flowchart showing a procedure of the printing processing of the third embodiment. FIG. 18 is a schematic view showing a procedure of the printing processing for overlapping a plurality of prints in which dots are thinned out in the rotation direction of the disk 100.

Figure 18A:
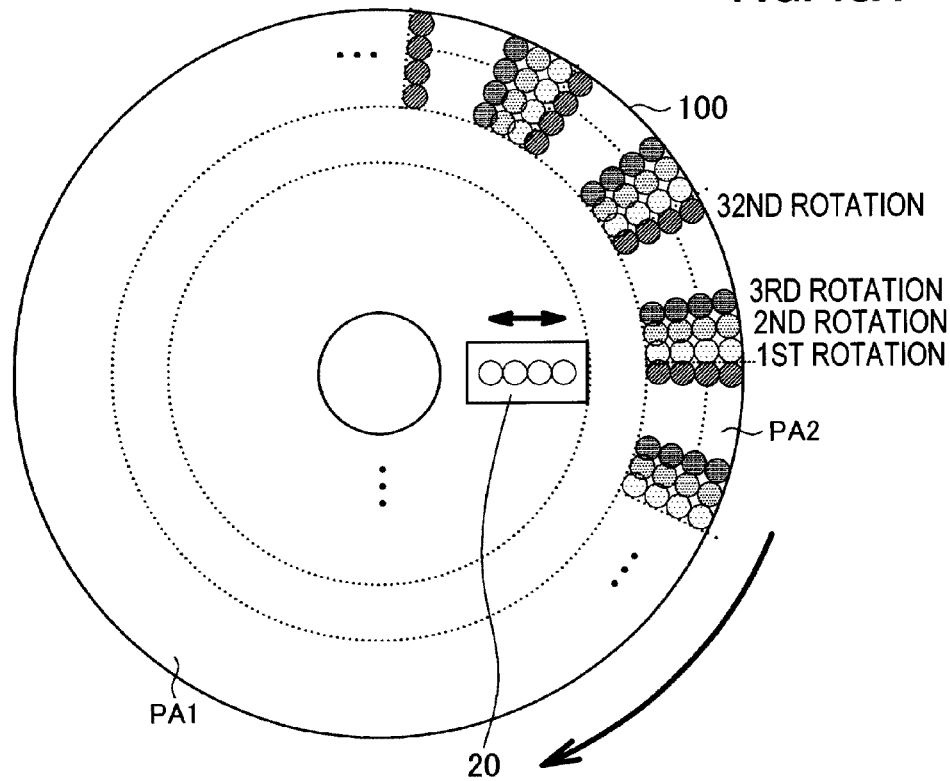
FIG. 18A is a schematic view showing a procedure of a printing processing for overlapping a plurality of prints in which dots are thinned out in the disk rotation direction.
Figure 18B:
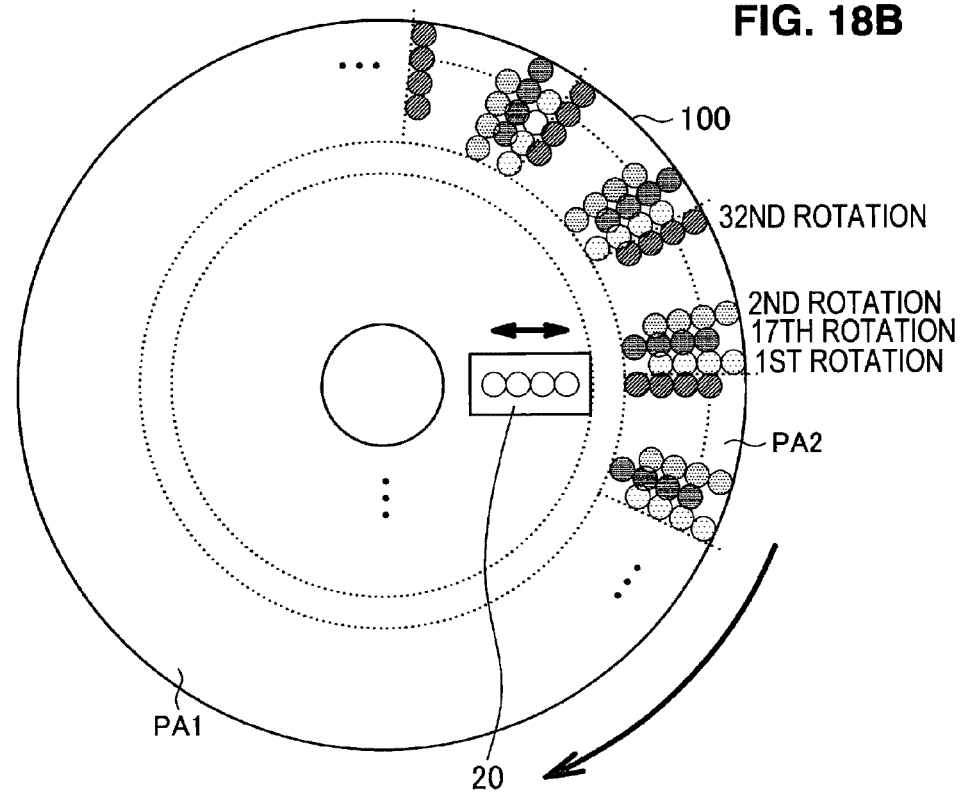
FIG. 18B is a schematic view showing a procedure of a printing processing when overlapping a plurality of prints in which dots are thinned out in the disk rotation direction while minutely moving the print head.
Figure 19A:
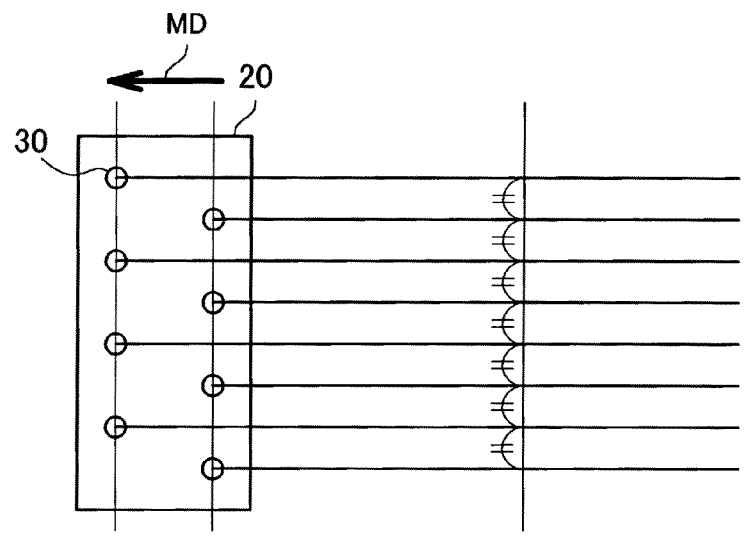
FIG. 19A is a view showing paths through which nozzles of a print head of XY scanning method having a zigzag arrangement pass over the disk.
Figure 19B:
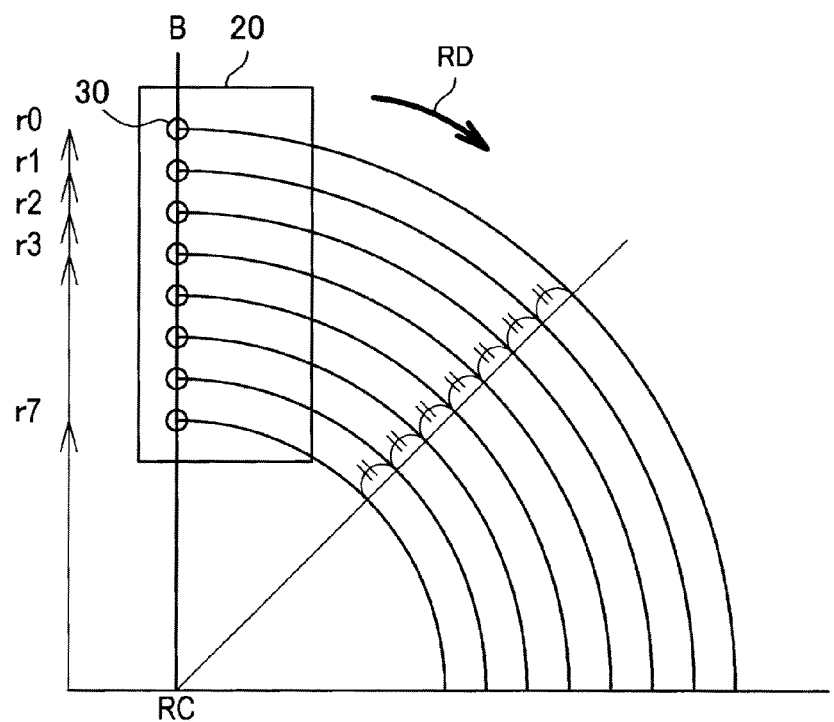
FIG. 19B is a view showing paths through which nozzles of a print head of Rθ scanning method having a single-line arrangement pass over the disk.

In FIG. 18A, an example of the printing processing in which dots are thinned out in the rotation direction of the disk 100 is shown. The printing surface 100a of the disk 100 is divided into a plurality of first print areas (PA1) 0, 1, . . . , L which have concentric ring shapes adjacent one another in the radial direction of the disk 100, in accordance with the number of nozzles in a nozzle line (the length of the nozzle line). In addition, each of the first print areas 0, 1, . . . , L is divided into the second print areas (PA2) 0, 1, . . . , M adjacent one another in the circumferential direction of the disk 100. While the disk 100 is rotated, the printing is performed to each of the second print areas 0, 1, . . . , M at sequential print timings 0, 1, . . . , N (for example, N=31). In FIGS. 18A and 18B, for convenience of illustration, the print head 20 is schematically illustrated as a print head 20 having a single line of nozzles.

In an example shown in FIG. 18A, for example, the printing is performed to the first print area 0 by overlapping 32 prints in which dots are thinned out in the rotation direction of the disk 100, while the disk 100 is rotated 32 times.

Specifically, when assuming continuous adjacent print positions 0 to 31, in the first rotation, for each of the second print areas 0, 1, . . . , M, the printing is performed in the print position 0 corresponding to the print timing 0. In the second rotation, for each of the second print areas 0, 1, . . . , M, the printing is performed in the print position 1 corresponding to the print timing 1. In the third rotation and later, for each of the second print areas 0, 1, . . ., M, the printing is performed sequentially in the print positions 2 to 31 corresponding to the print timings 2 to 31 respectively.

Furthermore, when the printing to the print area 0 is completed, the print head 20 is moved to the position corresponding to the first print area 1, and the printing to the first print area 1 is started in the same way as the case of the first print area 0.

In FIG. 18B, the process for performing the printing processing shown in FIG. 18A by using the print dot arrangement shown in FIG. 11. In the example shown in FIG. 18B, the printing is performed by overlapping 32 prints in which dots are thinned out in a constant period in the rotation direction of the disk 100, while the disk 100 is rotated 32 times.

Specifically, in the first rotation, for each of the second print areas 0, the printing is performed in the print position 0 corresponding to the print timing 0. In the second rotation, for each of the second print areas 0, the printing is performed in the print position 2 corresponding to the print timing 1. In the third to sixteenth rotations, for each of the second print areas 0, the printing is sequentially performed in the print positions 4, 6, . . . , 30 corresponding to the print timings 2 to 15.

After the printing is performed in the print position 30 for each of the second print areas in the sixteenth rotation, the print head 20 is moved minutely in the radial direction of the disk 100 by the dot pitch p. In the seventeenth to thirty-second rotations, while the print head 20 being minutely moved, for each of the second print areas 0, the printing is performed sequentially in the print positions 1, 3, . . . , 31 corresponding to the print timings 16 to 31 respectively.

In FIG. 18B, although a case in which the print dots are arranged as shown in FIG. 11 is described, a case in which the print dots are arranged as shown in FIG. 12 is also described in the same way. When the dot arrangement shown in FIG. 12 is performed, the print timings have a constant period between a plurality of adjacent print positions (for example, four print positions).

Specifically, in the first rotation, for each of the second print areas 0, the printing is performed in the print position 0 corresponding to the print timing 0. In the second rotation, for each of the second print areas 0, the printing is performed in the print position 4 corresponding to the print timing 1. In the third to eighth rotations, for each of the second print areas 0, the printing is performed in the print positions 8, 12, . . . , 28 corresponding to the print timings 2 to 7.

After the printing is performed in the print position 28 for each of the second print areas in the eighth rotation, the print head 20 is moved minutely in the radial direction of the disk 100 by 0.5 p which corresponds to a half the dot pitch p. In the ninth to sixteenth rotations, while the print head 20 being minutely moved, for each of the second print areas 0, the printing is performed sequentially in the print positions 1, 5, . . . , 29 corresponding to the print timings 8 to 15 respectively.

In the same way, after the print timing 15, the print head 20 is moved in the radial direction of the disk 100 by 0.5p. In the seventeenth to twenty-fourth rotations, the printing is performed sequentially in the print positions 2, 6, . . . , 30 corresponding to the print timings 16 to 23 respectively. Also, after the print timing 23, the print head 20 is minutely moved in the radial direction of the disk 100 by 0.5p. In the twenty-fifth to thirty-second rotations, the printing is performed sequentially in the print positions 3, 7, . . . , 31 corresponding to the print timings 24 to 31 respectively.

As described above, according to the printing method of this embodiment, for each of a plurality of print areas continuing in the rotation direction of a print object, the printing is performed in predetermined periodic print positions at the continuous first print timings. After the paths of the nozzles 30 are minutely moved, the printing is performed in the print positions adjacent to the print positions of the first print timings at the continuous second print timings. In this way, occurrence of print defects can be suppressed even when the printing is performed by overlapping a plurality of prints in which dots are thinned out in the rotation direction of the disk 100. Therefore, according to the printing method of this embodiment, the printing can be performed by discharging ink drops at a predetermined discharge frequency.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Figure 20A:
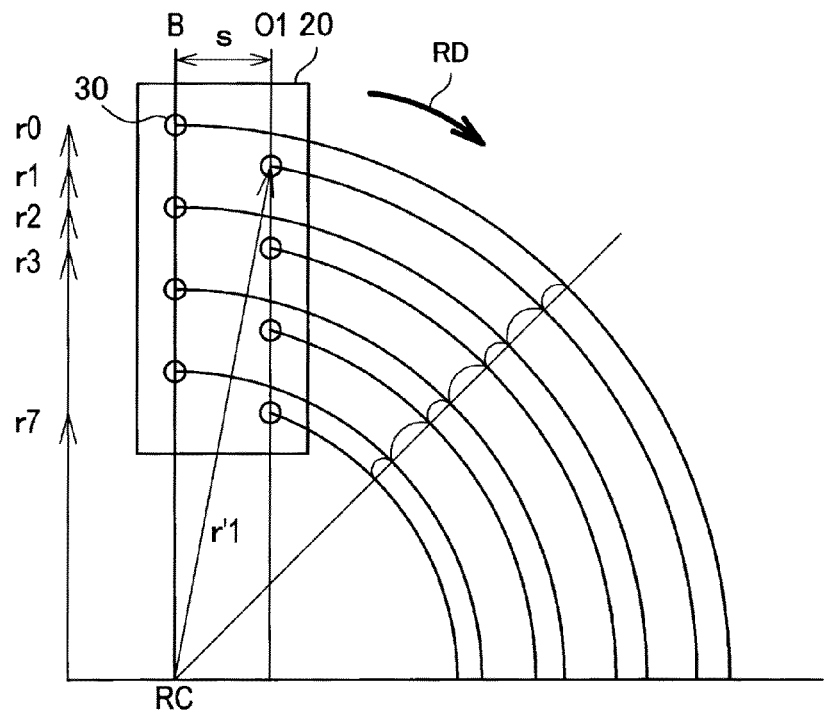
FIG. 20A is a view showing paths through which nozzles of a print head of Rθ scanning method having the zigzag arrangement pass over the disk.
Figure 20B:
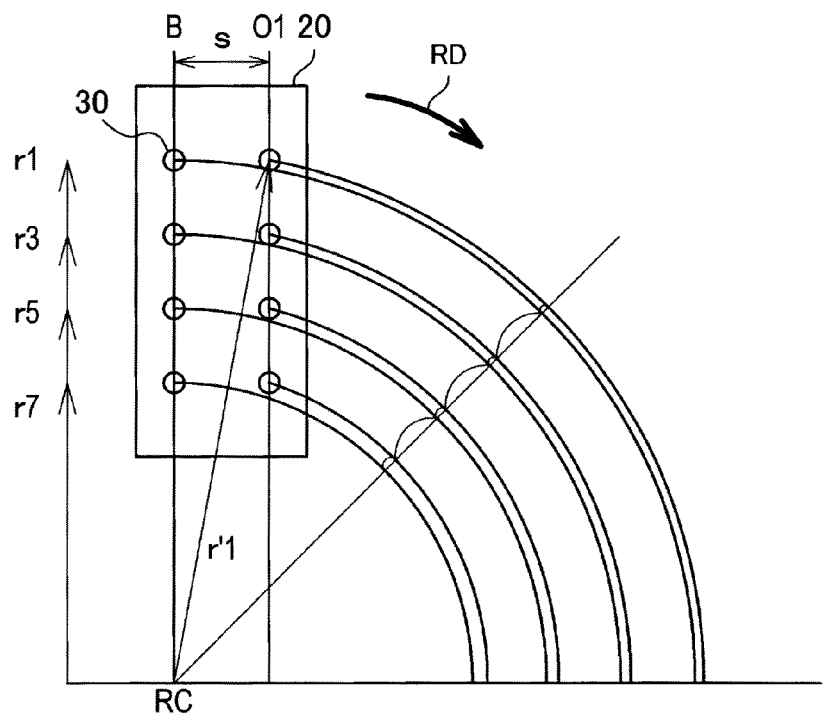
FIG. 20B is a view showing paths through which nozzles of a print head of Rθ scanning method having a multiple-line arrangement pass over the disk.
Figure 21A:
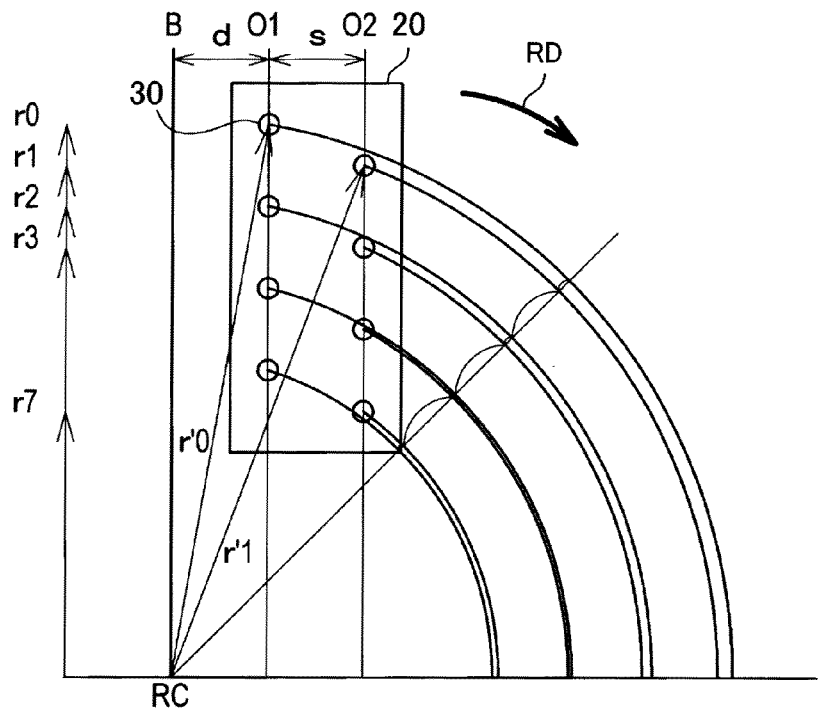
FIG. 21A is a view showing paths through which nozzles of a print head of Rθ scanning method having the zigzag arrangement pass over the disk.
Figure 21B:
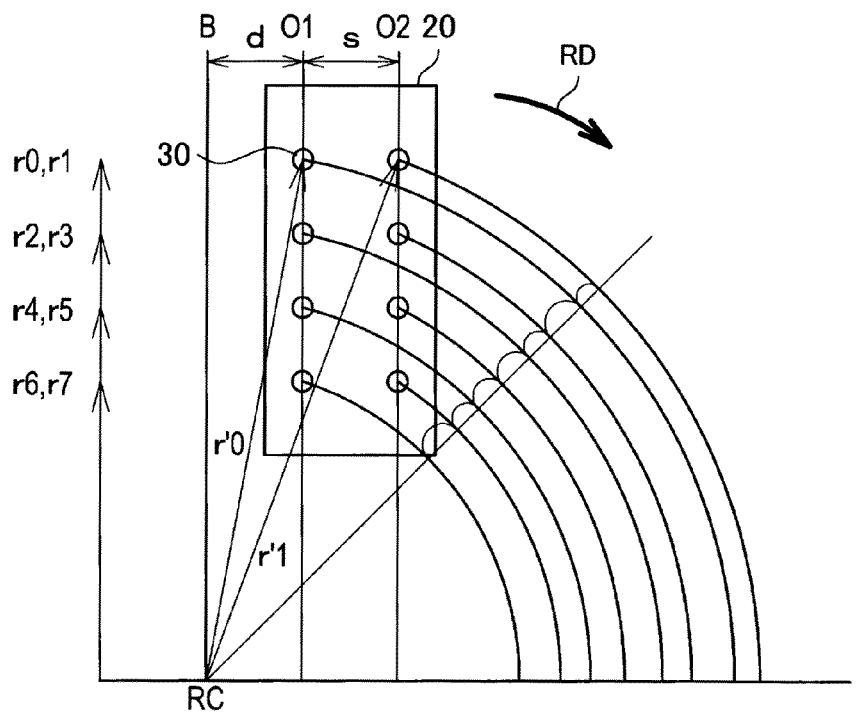
FIG. 21B is a view showing paths through which nozzles of a print head of Rθ scanning method having a multiple-line arrangement pass over the disk.

In the description of the above embodiments, the print head 20 in which the plurality of nozzles 30 are zigzag arranged is described. However, as mentioned in the description of the method in related art, the present invention is not only applied to the print head 20 in which nozzles are zigzag arranged, but also applied to, for example, the print head 20 in which a plurality of nozzle lines are arranged as shown in FIGS. 20B and 21B.

The present invention is suitably applied to the print head 20 having two or more nozzle lines arranged on two or more lines, out of the base line B corresponding to the radial direction of the circle drawn by the rotating print object (for example, the disk 100) and one or more offset lines O parallel to the base line B, discharging ink drops of the same color from the nozzles 30 of the nozzle lines. Especially, the present invention is suitably applied to the print head 20 having two or more nozzle lines including a nozzle line which is not line-symmetrically arranged with any other nozzle lines with respect to the base line B.

In the description of the above embodiments, it is described that print defects can be suppressed by moving the print head 20 minutely by a dot pitch p or by a half of the dot pitch. From viewpoint of suppressing irregular printing, however, the print head 20 may be minutely moved by a dot pitch equal to or higher than the dot pitch p.

The present invention contains subject matter related to Japanese Patent Application JP 2008-208039 filed in the Japan Patent Office on Aug. 12, 2008, the entire contents of which being incorporated herein by reference.

What is claimed is:

1. A printing apparatus comprising:
a rotation drive unit for rotating a print object;
a print head including at least two discharge nozzle lines arranged on at least two lines, out of a base line corresponding to a radial direction of a circle drawn by the rotating print object and at least one offset line parallel to the base line, the print head discharging ink drops of a same color from discharge nozzles of the at least two discharge nozzle lines;
a head drive unit for moving the print head a first distance so as to minutely move each of the discharge nozzle lines on the base line or the at least one offset line and for continuously minutely moving the print head a second distance to a second print area and printing on the second print area after a first print area has been printed, the second distance being longer than the first distance; and
a print control unit for controlling the head drive unit so as to minutely move paths of the discharge nozzles passing over the rotating print object, and controlling the print head so as to discharge ink drops from the discharge nozzles passing over the rotating print object through the paths moved minutely, in order to perform printing an area corresponding to a length of the discharge nozzle lines.

2. The printing apparatus according to claim 1, wherein, the print control unit, for a plurality of print positions continuing in a rotation direction of the print object, controls the print head so that ink drops are discharged from the discharge nozzles to a predetermined print position at a first print timing, controls the head drive unit so that the paths of the discharge nozzles are moved minutely, and thereafter, controls the print head so that ink drops are discharged from the discharge nozzles to a print position adjacent to the print position where the ink drops are discharged at the first print timing at a subsequent second print timing.

3. The printing apparatus according to claim 1, wherein, the print control unit, for a plurality of print positions continuing in a rotation direction of the print object, controls the print head so that ink drops are discharged from the discharge nozzles to predetermined periodic print positions out of the plurality of continuing print positions at continuous first print timings, controls the head drive unit so that the paths of the discharge nozzles are moved minutely, and thereafter, controls the print head so that ink drops are discharged from the discharge nozzles to print positions adjacent to the print positions where the ink drops are discharged at the first print timings at continuous second print timings.

4. The printing apparatus according to claim 1, wherein, a plurality of print positions continuing in a rotation direction of the print object are defined, the plurality of print positions are divided into a plurality of print areas continuing in the rotation direction of the print object, and
the print control unit, for a plurality of print positions continuing in the rotation direction of the print object in each of the print areas, controls the print head so that ink drops are discharged from the discharge nozzles to a predetermined print position in each of the print areas at a first print timing, controls the head drive unit so that the paths of the discharge nozzles are moved minutely, and thereafter, controls the print head so that ink drops are discharged from the discharge nozzles to a print position adjacent to the print position where the ink drops are discharged at the first print timing in each of the print areas at a subsequent second print timing.

5. The printing apparatus according to claim 1, wherein, a plurality of print positions continuing in a rotation direction of the print object are defined, the plurality of print positions are divided into a plurality of print areas continuing in the rotation direction of the print object, and
the print control unit, for a plurality of print positions continuing in the rotation direction of the print object in each of the print areas, controls the print head so that ink drops are discharged from the discharge nozzles to predetermined periodic print positions out of the plurality of continuing print positions in each of the print areas at continuous first print timings, controls the head drive unit so that the paths of the discharge nozzles are moved minutely, and thereafter, controls the print head so that ink drops are discharged from the discharge nozzles to a print position adjacent to the print position where the ink drops are discharged at the first print timings in each of the print areas at continuous second print timings.

6. The printing apparatus according to claim 1, wherein the at least two discharge nozzle lines include a discharge nozzle line which is not line-symmetrically arranged with any other discharge nozzle lines with respect to the base line.

7. The printing apparatus according to claim 1, wherein, in the at least two discharge nozzle lines, a plurality of discharge nozzles are arranged in a zigzag shape.

8. A printing method comprising:
- discharging ink drops of a same color from discharge nozzles passing through first paths over a rotating print object, by using a print head including at least two discharge nozzle lines arranged on at least two lines, out of a base line corresponding to a radial direction of a circle drawn by the rotating print object and at least one offset line parallel to the base line;
- moving the print head a first distance so as to minutely move each of the discharge nozzle lines on the base line or the at least one offset line;
- discharging ink drops of the same color from the discharge nozzles passing through second paths moved minutely from the first paths over the rotating print object; and
- continuously minutely moving the print head a second distance to a second print area after a first print area has been printed, the second distance being longer than the first distance and printing on the second print area.

9. An article of manufacture comprising a program storage device readable by a computer, tangibly embodying a program of instructions executable by the computer to perform a printing method comprising:
- discharging ink drops of a same color from discharge nozzles passing through first paths over a rotating print object, by using a print head including at least two discharge nozzle lines arranged on at least two lines, out of a base line corresponding to a radial direction of a circle drawn by the rotating print object and at least one offset line parallel to the base line;
- moving the print head a first distance so as to minutely move each of the discharge nozzle lines on the base line or the at least one offset line; and
- discharging ink drops of the same color from the discharge nozzles passing through second paths moved minutely from the first paths over the rotating print object; and
- continuously minutely moving the print head a second distance to a second print area after a first print area has been printed, the second distance being longer than the first distance and printing on the second print area.

* * * * *